United States Patent
Wu

(10) Patent No.: US 11,487,951 B2
(45) Date of Patent: Nov. 1, 2022

(54) FITNESS ASSISTANT CHATBOTS

(71) Applicant: Microsoft Technology Licensing, LLC, Redmond, WA (US)

(72) Inventor: Xianchao Wu, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 16/636,004

(22) PCT Filed: Sep. 18, 2017

(86) PCT No.: PCT/CN2017/102119
§ 371 (c)(1),
(2) Date: Feb. 1, 2020

(87) PCT Pub. No.: WO2019/051845
PCT Pub. Date: Mar. 21, 2019

(65) Prior Publication Data
US 2020/0242305 A1 Jul. 30, 2020

(51) Int. Cl.
*G06F 40/40* (2020.01)
*G06N 20/00* (2019.01)
(Continued)

(52) U.S. Cl.
CPC ............. *G06F 40/40* (2020.01); *G06N 5/02* (2013.01); *G06N 5/04* (2013.01); *G06N 20/00* (2019.01)

(58) Field of Classification Search
CPC ...... G06F 3/165; G06F 16/38; G06F 16/2455; G06F 19/3418; G16H 50/70
See application file for complete search history.

(56) References Cited

U.S. PATENT DOCUMENTS 8,296,319 B2 * 10/2012 Hirano ............... G06F 16/38
707/771
9,207,830 B2 * 12/2015 Papa ................... G06F 3/0484
(Continued)

FOREIGN PATENT DOCUMENTS

| CA | 2867547 C * | 4/2019 | ......... G06F 16/2453 |
| CA | 2807494 C * | 2/2020 | ........... G06F 16/252 |

(Continued)

OTHER PUBLICATIONS

Fadnil, A. and Gabrielli, Silvia, "Addressing Challenges in Promoting Healthy Lifestyles: The AI-Chatbot Approach", PervasiveHealth '17: Proceedings of the 11th EAI International Conference on Pervasive Computing Technologies for HealthcareMay 2017 pp. 261-265https://doi.org/10.1145/3154862.3154914 (Year: 2017).*

(Continued)

*Primary Examiner* — Anne L Thomas-Homescu
(74) *Attorney, Agent, or Firm* — Schwegman Lundberg & Woessner, P.A.

(57) ABSTRACT

A method for fitness assistance to a user in a conversation session, comprising: receiving, in the conversation session, at least one message, wherein the conversation session is between the user and an electronic conversational agent (1210); updating, based on the conversation session and one or more factors associated with the at least one message, a fitness intention associated with the user (1220); extracting, based on one or more factors associated with the at least one message, fitness information associated with the user (1230); obtaining at least one response, through applying a set of rules on the fitness information and the fitness intention (1240); generating, according to the at least one response, a response message including a fitness suggestion to the user (1250); and providing the response message including the fitness suggestion to the user (1260).

19 Claims, 18 Drawing Sheets

(51) Int. Cl.
*G06N 5/02* (2006.01)
*G06N 5/04* (2006.01)

(56) References Cited

U.S. PATENT DOCUMENTS

| | | | | |
|---|---|---|---|---|
| 10,841,724 B1* | 11/2020 | Tran | ............... | H04R 1/406 |
| 2007/0162903 A1* | 7/2007 | Babb, II | ............... | G06F 8/75 |
| | | | | 717/154 |
| 2010/0191075 A1* | 7/2010 | Angelides | ............... | G16H 20/10 |
| | | | | 709/219 |
| 2012/0231431 A1* | 9/2012 | Angelides | ............... | A61B 5/0002 |
| | | | | 434/262 |
| 2012/0283855 A1* | 11/2012 | Hoffman | ............... | G16Z 99/00 |
| | | | | 700/91 |
| 2013/0035563 A1* | 2/2013 | Angelides | ............... | G16H 20/60 |
| | | | | 600/301 |
| 2014/0215360 A1 | 7/2014 | Degani | | |
| 2014/0371887 A1* | 12/2014 | Hoffman | ............... | G01C 22/006 |
| | | | | 700/91 |
| 2015/0347520 A1* | 12/2015 | King | ............... | G06Q 50/01 |
| | | | | 707/741 |
| 2016/0232322 A1* | 8/2016 | Mensinger | ............... | A61B 5/0004 |
| 2017/0109218 A1* | 4/2017 | Corbin | ............... | G06F 16/9024 |
| 2017/0212666 A1* | 7/2017 | Hawkins, III | ............... | G06F 40/106 |
| 2017/0286396 A1* | 10/2017 | Sandor | ............... | G06F 16/2455 |
| 2018/0026879 A1* | 1/2018 | Aggarwal | ............... | H04L 67/26 |
| | | | | 709/228 |
| 2018/0286276 A1* | 10/2018 | Lee | ............... | G16H 20/60 |
| 2018/0314805 A1* | 11/2018 | Chang | ............... | G16H 20/70 |
| 2018/0329584 A1* | 11/2018 | Williams | ............... | H04L 67/12 |
| 2018/0330810 A1* | 11/2018 | Gamarnik | ............... | G16H 50/70 |

FOREIGN PATENT DOCUMENTS

| | | | | |
|---|---|---|---|---|
| CA | 3104714 A1 * | 3/2020 | ............ | G06F 16/355 |
| CN | 102799786 A | 11/2012 | | |
| CN | 106557576 A * | 4/2017 | ............ | G06F 16/3329 |
| CN | 106557576 A | 4/2017 | | |
| CN | 106709002 A * | 5/2017 | ............ | G06F 3/04817 |
| CN | 106709002 A | 5/2017 | | |
| WO | WO-2017043686 A1 * | 3/2017 | ............ | G06K 9/00671 |
| WO | WO-2017139651 A1 * | 8/2017 | ............ | G06F 3/04817 |

OTHER PUBLICATIONS

"International Search Report & Written Opinion Issued in PCT Application No. PCT/CN17/102119", dated Jun. 13, 2018, 10 Pages.

* cited by examiner

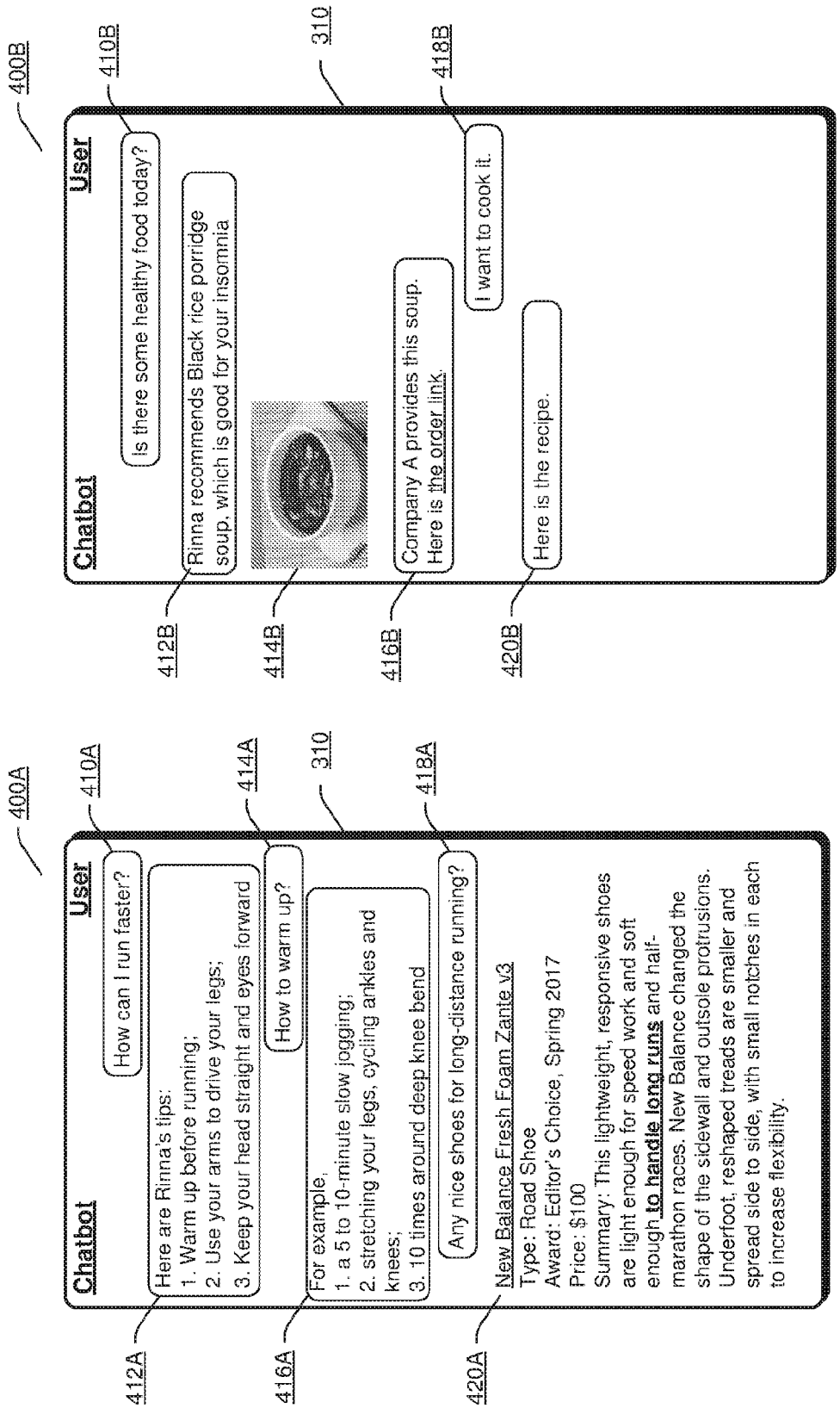

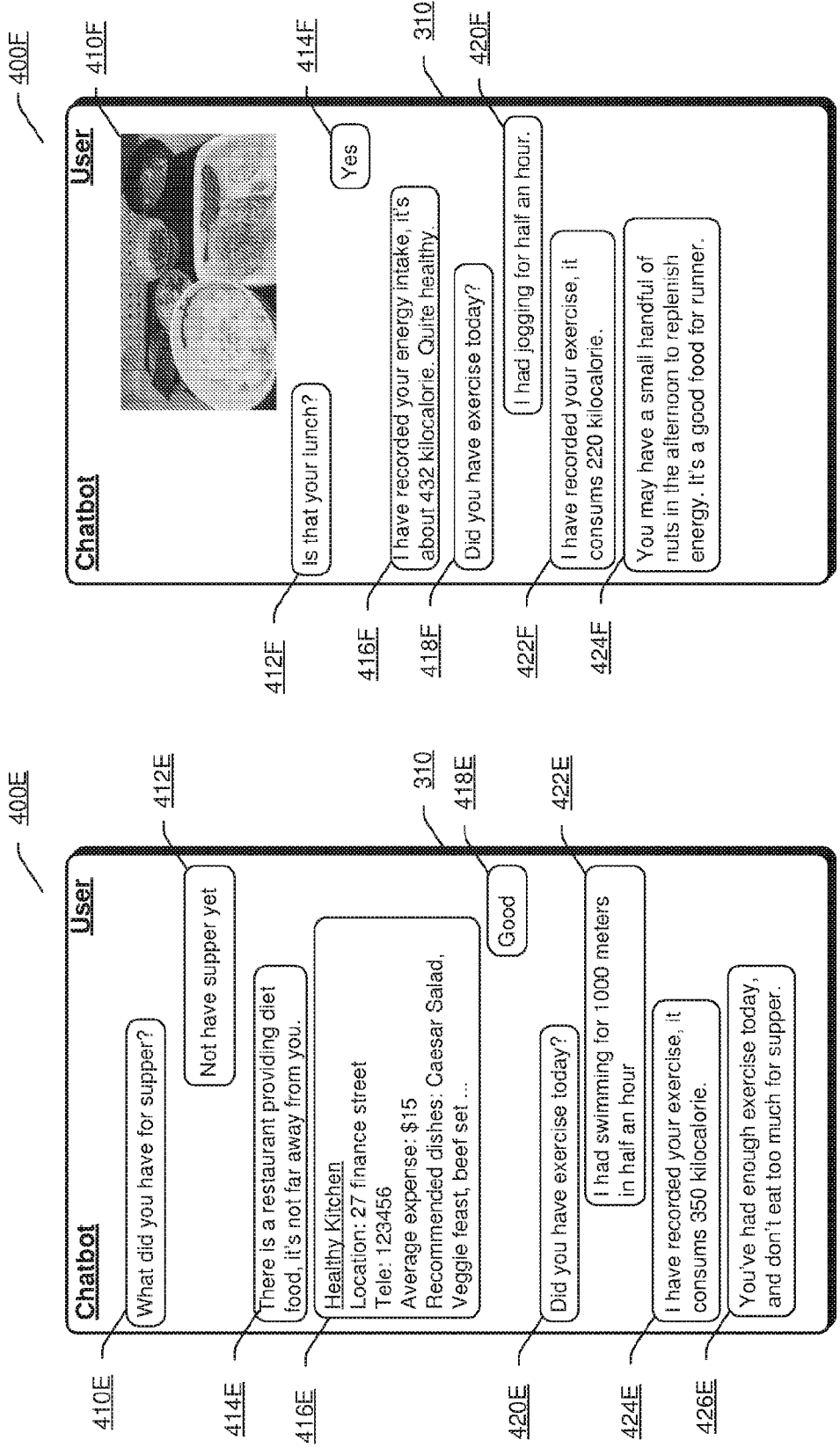

though only one terminal device 120 is shown in FIG. 1,
FITNESS ASSISTANT CHATBOTS

CROSS-REFERENCE TO RELATED APPLICATION

This application is a U.S. National Stage Filing under 35 U.S.C. 371 of International Patent Application Serial No. PCT/CN2017/102119, filed Sep. 18, 2017, and published as WO 2019/051845 A1 on Mar. 21, 2019, which application and publication are incorporated herein by reference in their entirety.

Artificial intelligence (AI) conversational chat programs are becoming more and more popular. These conversational chat programs, also referred to as chatbots, allow users to carry on conversations with a virtual entity. The chatbot is designed to simulate people's conversation, and may chat with users by text, speech, image, etc.

SUMMARY

This Summary is provided to introduce a selection of concepts that are further described below in the Detailed Description. It is neither intended to identify key features or essential features of the claimed subject matter, nor intended to be used to limit the scope of the claimed subject matter.

Embodiments of the present disclosure provide a method for fitness assistance to a user in a conversation session. At least one message is received in a conversation session, wherein the conversation session is between the user and an electronic conversational agent. A fitness intention associated with the user is updated based on the conversation session and one or more factors associated with the at least one message. The fitness information associated with the user is extracted based on one or more factors associated with the at least one message. At least one response is obtained through applying a set of rules on the fitness information and the fitness intention. A response message including a fitness suggestion to the user is generated according to the at least one response. The response message including the fitness suggestion is provided to the user.

It should be appreciated that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

FIG. 4A-4F each illustrates an exemplary conversation flow according to an embodiment.

DETAILED DESCRIPTION

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

Figure 1:
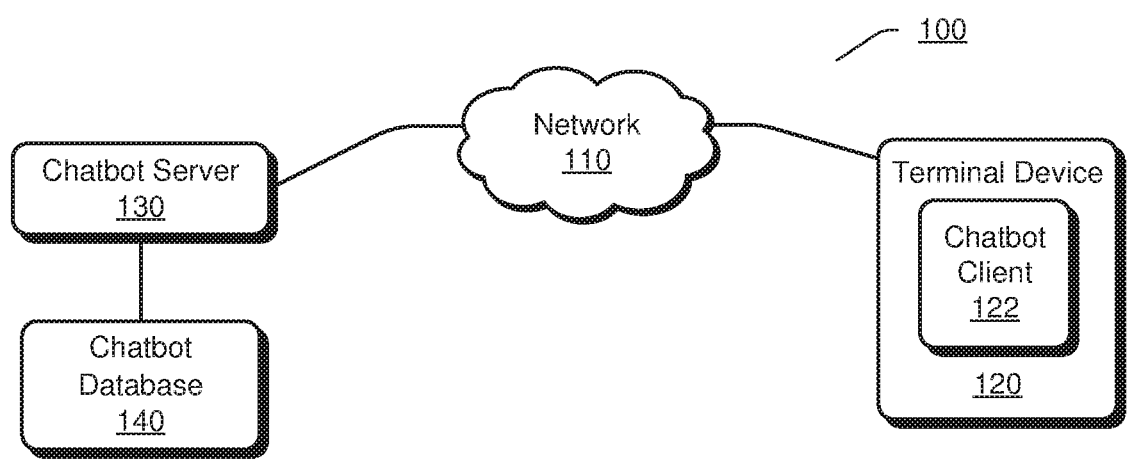
FIG. 1 illustrates an exemplary environment where the described techniques can be implemented according to an embodiment.

FIG. 1 illustrates an exemplary environment 100 where the described techniques can be implemented according to an embodiment.

In FIG. 1, a network 110 is applied for interconnecting among a terminal device 120 and a chatbot server 130. The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be a desktop computer, a laptop, a tablet, a smart phone, smart sound box, a smart sport assistance device such as a sport bracelet, a sport watch and so on. Although only one terminal device 120 is shown in FIG. 1, it should be appreciated that a different number of terminal devices may be connected to the network 110.

The terminal device 120 may include a chatbot client 122 which may provide automated chatting service for a user. In some implementations, the chatbot client 122 may interact with the chatbot server 130. For example, the chatbot client 122 may transmit messages inputted by the user to the chatbot server 130, and receive response messages associated with the messages from the chatbot server 130. However, it should be appreciated that, in other implementations, instead of interacting with the chatbot server 130, the chatbot client 122 may also locally generate responses to messages inputted by the user.

The chatbot server 130 may connect to or incorporate a chatbot database 140. The chatbot database 140 may comprise information that can be used by the chatbot server 130 for generating response messages.

It should be appreciated that all the network entities shown in FIG. 1 are exemplary, and depending on specific application requirements, any other network entities may be involved in the application scenario 100.

Figure 2:
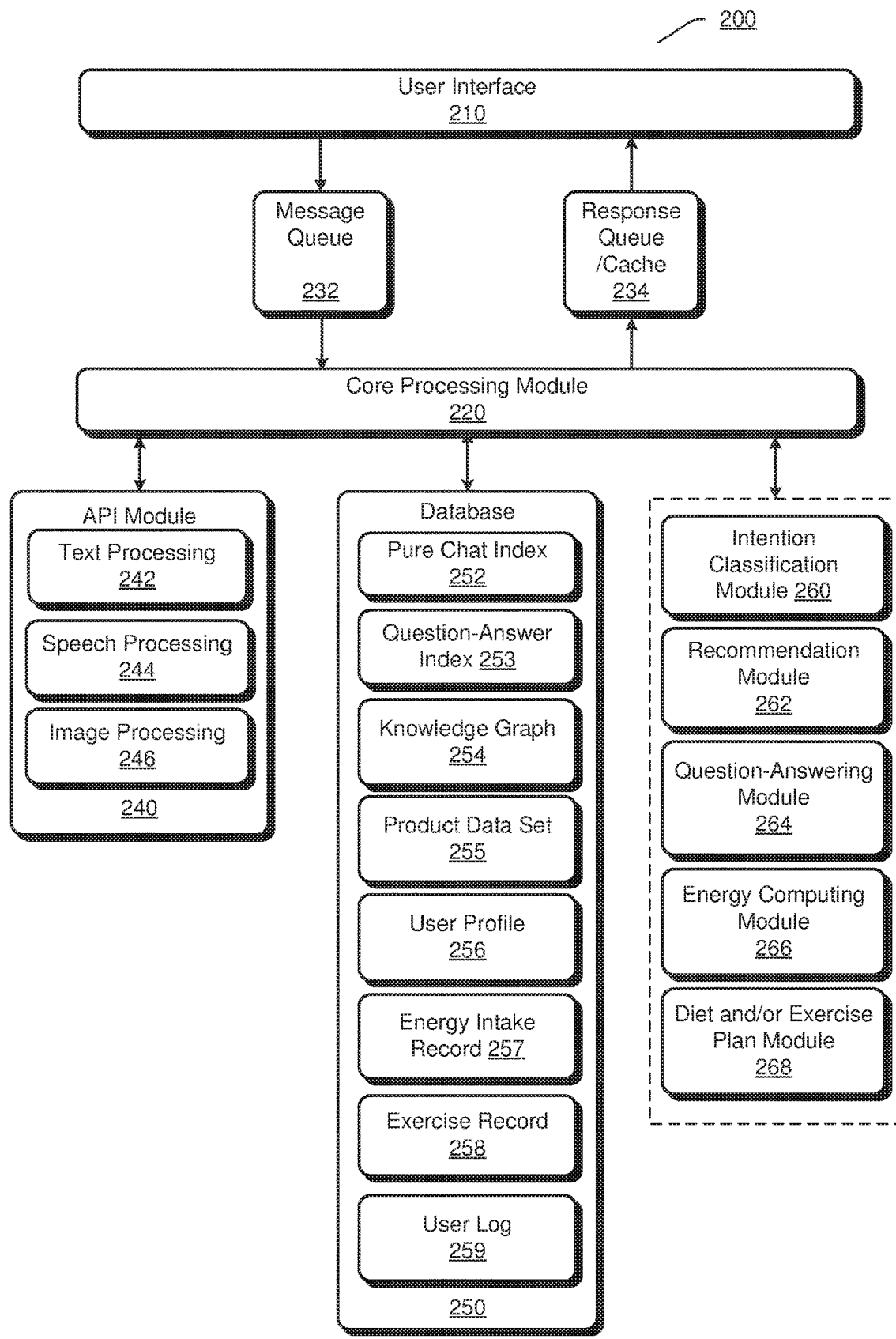
FIG. 2 illustrates an exemplary system applying a chatbot according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages inputted by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text parsing on the text message, and the core processing module 220 may further determine a text response.

For a speech message, the speech processing unit 244 may perform a speech-to-text conversion on the speech message to obtain text messages, the text processing unit 242 may perform text parsing on the obtained text messages, and the core processing module 220 may further determine a text response. If it is determined to provide a response message in speech, the speech processing unit 244 may perform a text-to-speech conversion on the text response to generate a corresponding speech response message.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through a database 250. The database 250 may comprise a pure chat index 252, a question-answer (QA) index 253, a knowledge graph 254, a product and/or service data set 255, a user profile data set 256, an energy intake record 257, an exercise record 258, a user log 259. It should be appreciated that the data sets 252 to 259 are illustrative, and there may be more or less data sets in different implementations.

The pure chat index set 252 may comprise index items that are prepared for free chatting between users and the chatbot, and may be established with data from social networks. The index items in the pure chat index set 252 may or may not be in a form of question-answer pair. The question-answer pair may also be referred to as message-response pair or query-response pair.

The question-answer pair index set 253 may comprise question-answer pairs associated with an application implemented in the chatbot. In an implementation, the question-answer pair index set 253 may comprise question-answer pairs related to fitness. In an aspect, the question-answer pairs related to fitness may be used as index to provide response messages associated with user queries. In another aspect, the question-answer pairs related to fitness may be used as knowledge related to fitness.

The knowledge graph 254, which may also be referred to as knowledge data set, may comprise topic knowledge data, which are typically in the form of tuples. In an implementation, the knowledge graph 254 comprises knowledge data related to fitness. The fitness knowledge involves various fitness related aspects, such as energy intake information, energy consumption information, type of exercise, sport, diet, health condition, related products such as sport equipment, healthy diet, related service such as exercise training, recovering treatment, and so on.

The product data set 255 may comprise information of products and/or services, which are provided by product provider such as sport equipment manufacture, diet food restaurant, gym and so on. As a service is also a kind of product, the term product is used to denote both the product and the service here. The product data set may be provided by the providers of the products, and may be in various forms, such as in the form of question-answer pairs, tuples, or plain text.

Although the question-answer index 253, the knowledge graph 254 and the product data set 255 are illustrated as separate data sets, it should be appreciated that all of these data sets may provide knowledge related to fitness, and may be referred to as knowledge data related to fitness.

The user profile data set 256 may comprise user profiles. The user profile may include information such as gender, age, location, fitness preference, height, weight, health condition and so on.

The energy intake record 257 may comprise records of energy intake of respective users. The energy is computed in unit of calorie. The exercise record 258 may comprise records of exercise information of respective users. And the user log 259 may comprise log data of messages communicated between the chatbot and respective users.

After receiving a query from a user, the core processing module 220 may generate a response message by using one or more of an intention classification module 260, a recommendation module 262, a knowledge based question-answering module 264, an energy computing module 266, a diet and/or exercise plan module 268 based on the database 250. It should be appreciated that although modules 260 to 268 are illustrated, there may be more or less modules in different implementations.

In an implementation, the intention classification module 260 may classify the query as having a specific intention. For example, the intention classification module 260 may identify a user intention as fitness intention, for example, muscle-building, weight losing, or sport equipment requirement, or the like from the query, and may classify the query as having no intention.

In an implementation, when the query is classified as having no specific intention, the question-answering module 264 may generate a response message for the query based on the question-answer index 253. When the query is classified as having a specific intention, the recommendation module 262 may generate recommendation in response to the query based on the question-answer index 253, the knowledge graph 254 and the product data set 255.

In an implementation, the energy computing module 266 may compute energy based on a message from the user, and examples of the message may be text, voice or image. The diet and/or exercise plan module 268 may generate a diet and/or exercise plan for a user, for example, having light-calorie diet in this month, losing five kilograms within three months, jogging ten kilometers in one week, and so on.

The responses determined by the core processing module 220 may be provided to a response queue or response cache 234 as response messages. For example, the response cache 234 may ensure that a sequence of response messages can be displayed in a pre-defined time stream.

The response messages in the response queue or response cache 234 may be further transferred to the user interface 210, such that the response messages can be displayed to the user in the chat window.

The user interface 210 may be implemented in the chatbot system 200, and may also be implemented on another platform. For example, the user interface 210 may be implemented on a third party chatting application.

It should be appreciated that all the elements shown in the chatbot system 200 in FIG. 2 are exemplary, and depending on specific application requirements, some shown elements may be omitted and some other elements may be involved in the chatbot system 200.

Figure 3:
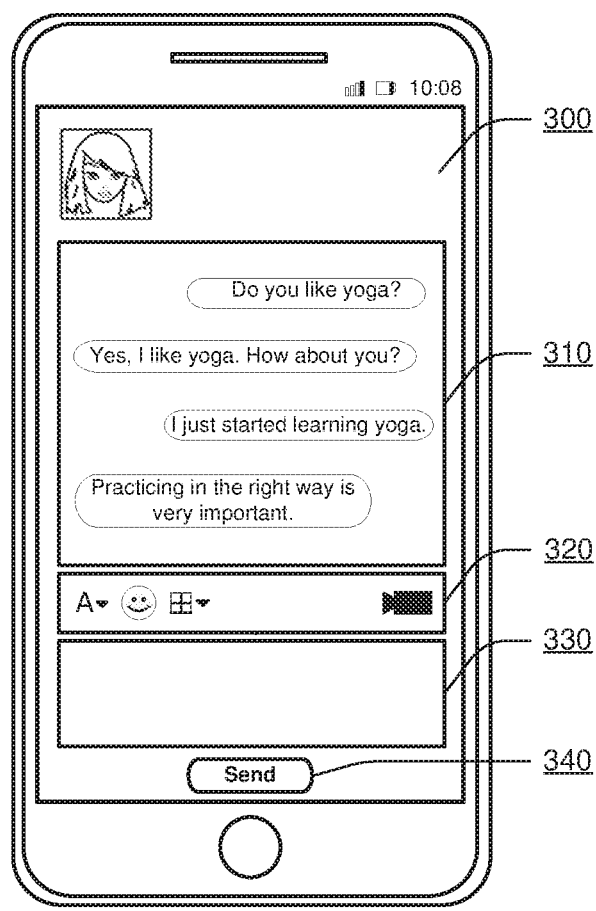
FIG. 3 illustrates an exemplary user interface (UI) according to an embodiment.

FIG. 3 illustrates an exemplary chat window 300 according to an embodiment. The chat window 300 may comprise a presentation area 310, a control area 320 and an input area 330. The presentation area 310 displays messages and response messages in a chat flow. The control area 320 includes a plurality of virtual buttons for the user to perform message input settings. For example, the user may select to make a voice input, attach image files, select emoji symbols, make a short-cut of the current screen, etc. through the control area 320. The input area 330 is used for the user to input messages. For example, the user may type text through the input area 330. The chat window 300 may further comprise a virtual button 340 for confirming to send the inputted messages. If the user touches the virtual button 340, the messages inputted in the input area 330 may be sent to the presentation area 310.

It should be noted that all the elements and their layout shown in FIG. 3 are exemplary. Depending on the specific application requirements, the chat window in FIG. 3 may omit or add some elements, and the layout of the elements in the chat window in FIG. 3 may also be changed in various manners. For example, although the messages are illustrated as text in the presentation area 310, the messages may also be in the form of voices having the same content. Accordingly, the display screen, which provides the presentation area 310, may be not necessary in some implementations such as a smart sound box, a compact fitness assistant equipment or the like.

FIG. 4A illustrates an exemplary chat flow 400A according to an embodiment. Only the presentation area 310 of the UI is illustrated in FIG. 4A. In the exemplary chat flow 400A, the chatbot provides fitness suggestion by answering question from the user based on fitness related knowledge, such as fitness intention and fitness information. For example, the chatbot may provide suggestion about how to run faster or how to warm up, and also may provide recommendations of fitness related product in response to a query from the user.

After the user inputs a message "How can I run faster?" at 410A, the chatbot may generate a response message as illustrated at 412A based on fitness related knowledge. In an implementation, the question-answering module 264 may be responsible for generating the response message by matching the user's message with knowledge in the question-answer index 253 and the knowledge graph 254.

After the user inputs a message "How to warm up?" at 414A, the chatbot may generate a response message as illustrated at 416A based on fitness related knowledge. In an implementation, the question-answering module 264 may be responsible for generating the response message by matching the user's message with knowledge in the question-answer index 253 and the knowledge graph 254.

After the user inputs a message "Any nice shoes for long-distance running?" at 418A, the chatbot may classify the message as having a specific user intention such as sport shoes requirement, and the chatbot may take this opportunity to provide a recommendation as illustrated at 420A based on fitness related knowledge and fitness related product data set. In an implementation, the recommendation module 262 may be responsible for generating the recommendation by matching the user's message with knowledge in the question-answer index 253, the knowledge graph 254 and product data set 255. The recommendation message 420A may provide brief information about the recommended product, and more or less information may be provided in the recommendation message 420A, for example a picture of the shoes may be presented in the message. And the underlined name of the message 420A may provide a link to the website which may provide the purchasing information of the recommended product.

FIG. 4B illustrates an exemplary chat flow 400B according to an embodiment. Only the presentation area 310 of the UI is illustrated in FIG. 4B. In the exemplary chat flow 400B, the chatbot provides recommendations of fitness related product in response to a query from the user.

After the user inputs a message "Is there some healthy food today?" at 410B, the chatbot may classify the message as having a specific user intention such as healthy food seeking, and the chatbot may take this opportunity to provide a recommendation as illustrated at 412B based on fitness related knowledge and fitness related product data set. In an implementation, the recommendation module 262 may be responsible for generating the recommendation by matching the user's message with knowledge in the question-answer index 253, the knowledge graph 254 and product data set 255 in consideration of other factor such as the user's health condition. The recommendation messages 412B to 416B may provide brief information about the recommended product, such as a picture of the recommended product and the ordering link.

After the user inputs a message "I want to cook it." at 418B, the chatbot may generate a response message as illustrated at 420B based on fitness related knowledge such as food recipe. In an implementation, the question-answering module 264 may be responsible for generating the response message by matching the user's message with knowledge in the question-answer index 253 and the knowledge graph 254.

Figures 4C, 4D:
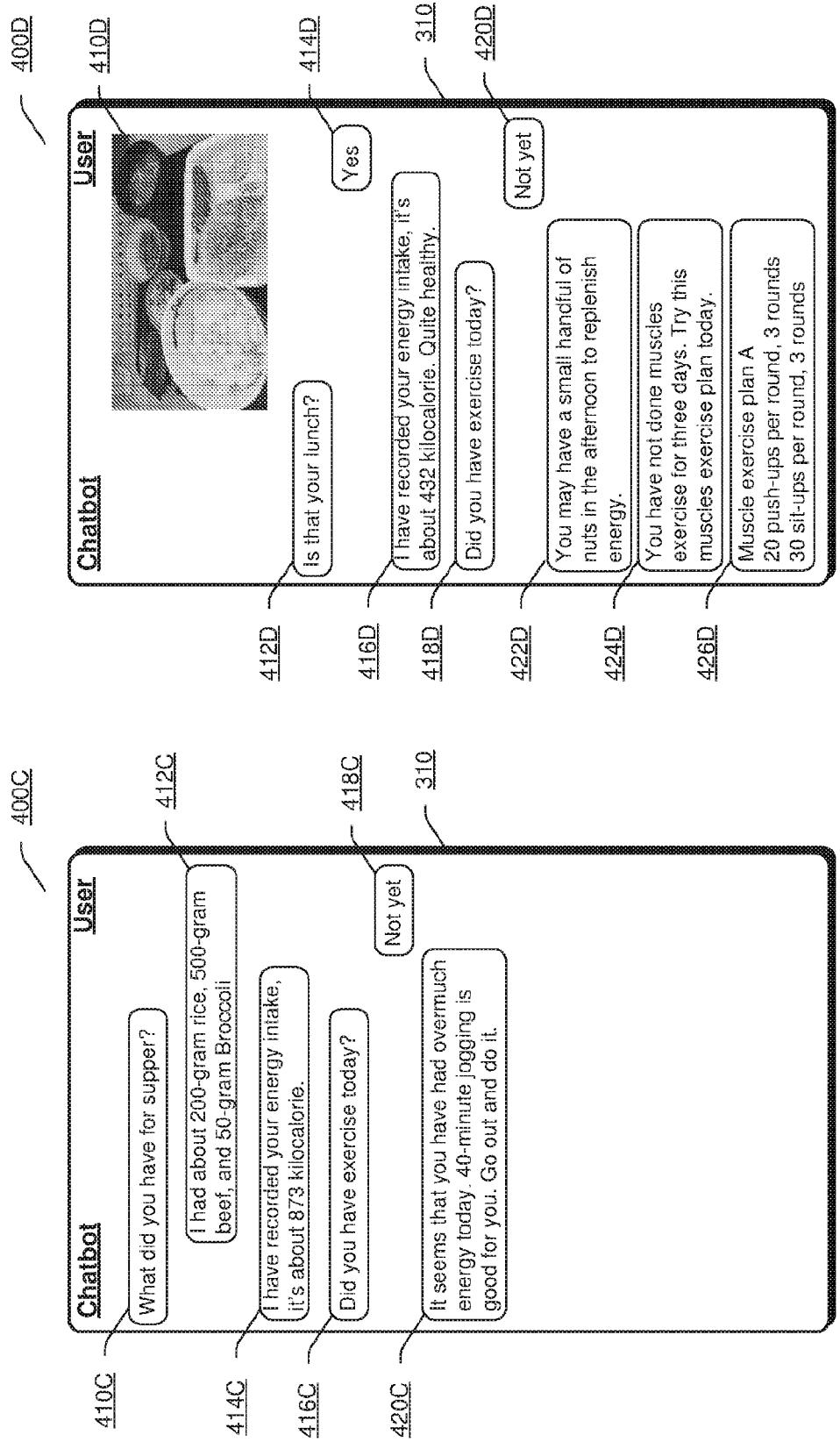

FIG. 4C illustrates an exemplary chat flow 400C according to an embodiment.

The chatbot proactively outputs a message "What did you have for supper?" at 410C.

After the user inputs a message "I had about 200-gram rice, 500-gram beef, and 50-gram Broccoli" at 412, the chatbot may calculate the energy intake amount of the user based on the message, and record the energy intake amount in the energy intake record 257 of the user. In an implementation, the energy computing module 266 may be responsible to calculate the energy intake amount and the energy consuming amount.

The chatbot then proactively output a message "Did you have exercise today?" at 416C. After the user inputs a message "not yet" at 418, the chatbot may provide a fitness suggestion based on the energy intake record and the exercise record, for example, "It seems you have had too much energy today. 40-minute jogging is good for you. Go out and do it" as illustrated at 420C. In an implementation, the diet and/or exercise plan module 268 may be responsible to provide the fitness suggestion.

In an implementation, the fitness suggestion may be provided based on the energy intake record and the exercise record. For example, the diet and/or exercise plan module 268 may determine the difference of the energy intake amount and the energy consumption amount based on the energy intake record and the exercise record, and may provide suggestions based on the difference. For example, if the difference shows that the user has taken excess energy, then a suggestion of aerobic exercise may be provided in order to consume the excess energy intake. And the length of the aerobic exercise may also be determined based on the amount difference.

In an implementation, the fitness suggestion may be provided based on the energy intake record. For example, the diet and/or exercise plan module 268 may determine that the energy intake amount is too much or too little for the user, and may provide a suggestion based on the energy intake amount. For example, a diet suggestion of eating low-calorie food and/or an exercise suggestion of performing aerobic exercise may be provided when the energy intake amount is too much. For example, a diet suggestion of balanced diet may be provided when the energy intake amount is too little.

In an implementation, the fitness suggestion may be provided based on the exercise record. For example, the diet and/or exercise plan module 268 may determine that the muscular exercise has not been done by the user for a period such as a week, and may provide a suggestion for performing muscular exercise based on the exercise record.

It should be appreciated that there may be various ways to provide the diet and/or exercise plan based on the energy intake record and/or exercise record, and the disclosure is not limited to the specific way of making the diet and/or exercise plan.

In the exemplary chat flow 400C, the chatbot proactively asks for the fitness information of the user for tracking an achievement of the fitness intention in the conversation session. The proactive asking may be scheduled at periodic time, for example, at the time around the breakfast, lunch and supper, or at predefined time, for example, when the chatbot is activated or any specific time defined by the user. In this way, the chatbot may track the completing status of fitness intention of the user effectively.

FIG. 4D illustrates an exemplary chat flow 400D according to an embodiment.

The chatbot receives an image message from the user at 410D. The chatbot may identify whether there is food in the image, and may confirm whether the food in the image is taken by the user by outputting a question "Is that your lunch?" at 412D.

After the user inputs a message "Yes" at 414D, the chatbot may determine that the food in the image is taken by the user. Then the chatbot may calculate the energy intake amount of the user based on the image and record the energy intake amount in the energy intake record 257 of the user. Referring to FIG. 4C, an image message may also be outputted at 412C in place of the text or speech message 412C. The chatbot may determine that the food shown in the image message 412C is taken by the user based on the context of the conversation 400C, and thus may not output a question such as "Is that your supper?".

The chatbot may take this opportunity to proactively output a message "Did you have exercise today?" at 418D. After the user inputs a message "not yet" at 420D, the chatbot may provide a diet suggestion at 422D and an exercise suggestion at 424D, 426D based on the energy intake record and the exercise record.

FIG. 4E illustrates an exemplary chat flow 400E according to an embodiment.

The chatbot proactively outputs a message "What did you have for supper?" at 410E.

After the user inputs a message "Not have supper yet" at 412E, the chatbot may take this opportunity to provide a recommendation for the user. In an implementation, the chatbot may identify a user intention of food seeking, and provide a recommendation according to the user intention. The chatbot presents the recommendation such as a diet restaurant at 414E and 416E.

Then the chatbot may proactively output a message "Did you have exercise today?" at 420E. After the user inputs a message "I had swimming for 1000 meters in half an hour" at 422E, the chatbot may calculate the energy consumed by the user and record the exercise and the energy consumption amount in the exercise record 258. Then the chatbot may provide an exercise suggestion and a diet suggestion at 426E based on the energy intake record and the exercise record.

FIG. 4F illustrates an exemplary chat flow 400F according to an embodiment.

The chatbot receives an image message from the user at 410F. The chatbot may identify whether there is food in the image, and may confirm whether the food in the image is taken by the user by outputting a question "Is that your lunch?" at 412F.

After the user inputs a message "Yes" at 414F, the chatbot may determine that the food shown in the image is taken by the user. Then the chatbot may calculate the energy intake amount of the user based on the image and record the energy intake amount in the energy intake record 257 of the user.

The chatbot may take this opportunity to proactively output a message "Did you have exercise today?" at 418F. After the user inputs a message "I had jogging for half an hour." at 420F, the chatbot may calculate the energy consumed by the user and record the exercise and the energy consumption amount in the exercise record 258 at 422F. Then the chatbot may provide a diet suggestion at 424E based on the energy intake record and the exercise record.

It should be appreciated that there may be various variations to the chat flow 400A to 400F, and the disclosure is not limited to the specific chat flow.

Figure 5:
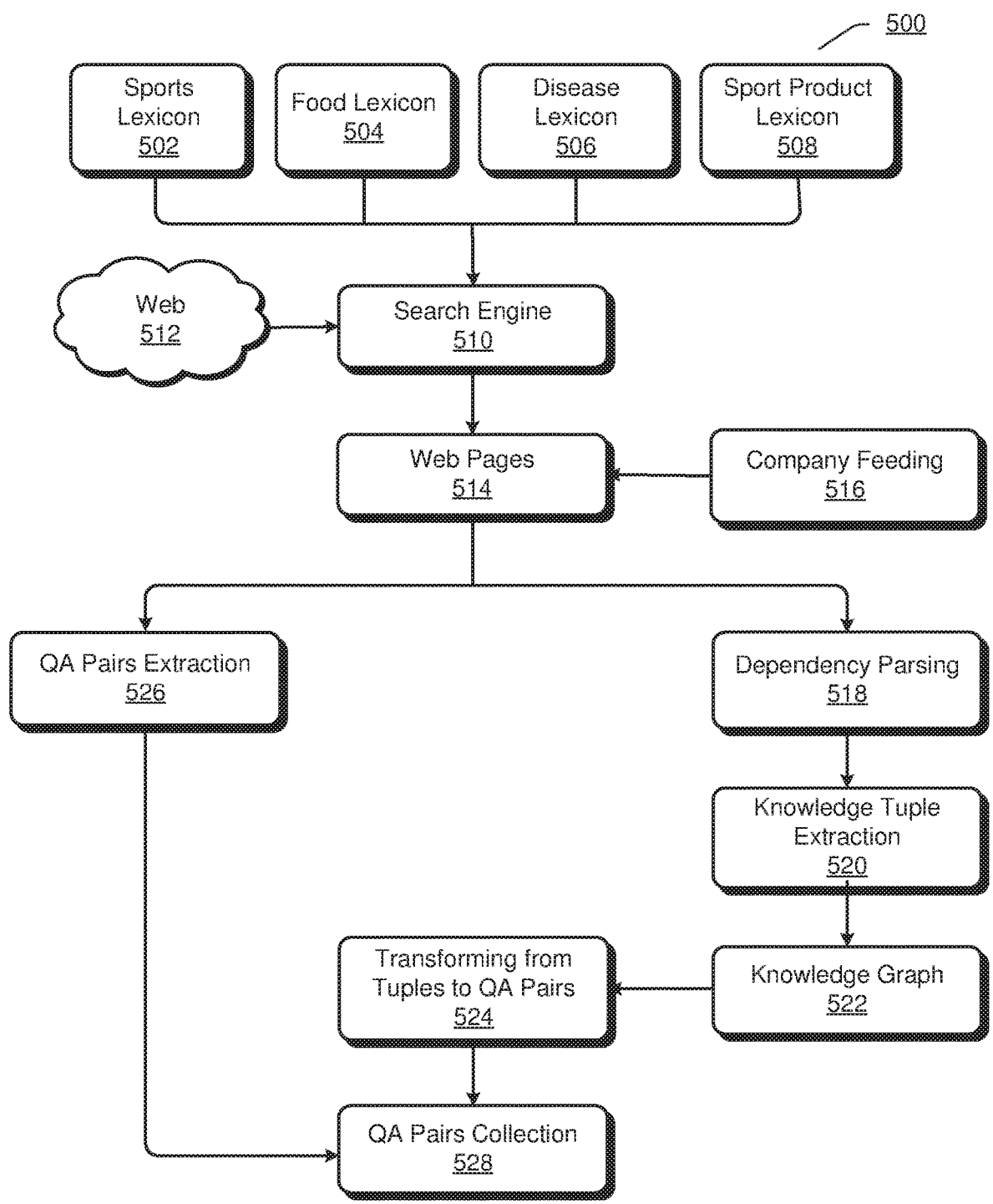
FIG. 5 illustrates an exemplary process for collecting knowledge data according to an embodiment.

FIG. 5 illustrates an exemplary process 500 for constructing a knowledge data set according to an embodiment.

Fitness related lexicons 502 to 508 may be used to provide searching keywords for the search engine 510. It should be appreciated that various types of lexicons may be used to provide the fitness related information, and the disclosure is not limited to the sport lexicon 502, food lexicon 504, disease lexicon 506 and sport product lexicon 508. A sport lexicon is related to fitness. A disease lexicon, especially diseases that are related to sport, may provide knowledge for fitness, especially disease or hurt recovering. A food lexicon may provide knowledge for fitness-related food recommendation. A sport product lexicon may provide knowledge for related product answering and product recommendation.

Each entry may be picked from these lexicons 502 to 508 and sent to a search engine 510. The search engine 510 may retrieve related web pages 514 from the web 512 by using the entry as searching keyword.

Additionally or alternatively, the web pages may directly come from company feeding 516. For example, partner companies such as manufactures, shops, restaurants, and so on may supply the related data, which is also shown as web pages 514 for sake of simplicity. The result web pages 514 may contain related fitness information, such as at least one type of sports, one type of disease (e.g. related to sport), one type of food name or food menu (e.g., related to sport), or one type of sport product. Then the raw materials for fitness related knowledge are collected from the web.

The web pages may be classified into two types. One type is in question-answer style, such as some question-answer style websites for <sport, food menu recommendation>, <sport, disease resolution recommendation>, <sport, sport product recommendation>. The other one is in plain text style.

For the plain text, dependency parsing may be performed at 518 to obtain syntactic structures of the sentences in the plain text. Then knowledge tuples may be extracted from the dependency trees of the sentences at 520. And knowledge graph 522 including the knowledge tuples may be obtained.

Figure 6:
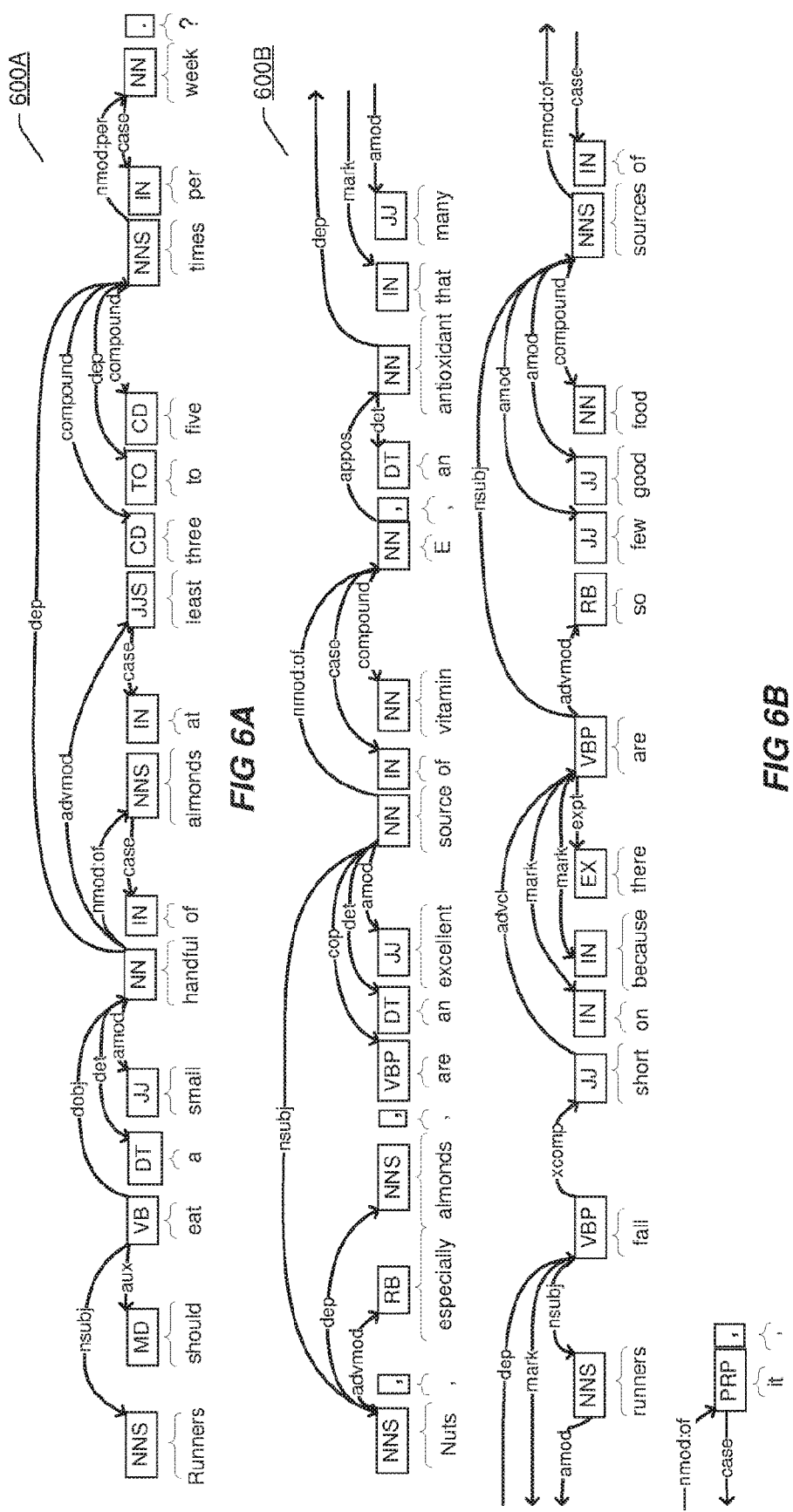
FIG. 6A-6C illustrates exemplary dependency trees of sentences according to an embodiment.

FIG. 6A and FIG. 6B illustrates dependency trees of two sentences according to an embodiment. The dependency trees are obtained by performing dependency parsing on the sentences. Any dependency parsing technique may be used to perform the dependency parsing. There are many acronyms shown in the dependency trees, and the explanation of some acronyms which are not related to the following description is omitted for sake of simplicity.

The extracting process 520 is to follow the dependency arcs which link predicates with arguments and link entities with syntactic relations.

The food lexicon 504 contains the following entities: nut, almond, vitamin E, antioxidant, and the sport lexicon 502 contains the following entity: runner.

Then, a sport-related entity "runners" and a food-related entity "almonds" may be linked by using the following arcs shown in dependency tree 600A: <runners, eat, nsubj>, where nsubj stands for noun style subject of the arc; <eat, handful of almonds, dobj>, where dobj stands for direct objective argument.

Then, the following tuple may be obtained by combining these two dependency arcs together: <runners, handful of almonds, eat>.

This is a tuple example in the form of <entity, entity, relationship>, specifically<sport, food, relation>. Through this way, available relationships for the foods and sports that appear in the given plain text may be collected.

Moreover, relations of entities that are both foods or both sports may be extracted. For example, a food "nuts" and a food "vitamin E" may be linked by utilizing the following dependency arcs in the dependency tree 600B: <nuts, source, nsubj>, <source, vitamin E, nmod:of>, where nmod stands for noun style modification guided by "of" keyphrase.

Then, the following tuple may be obtained by combining these two dependency arcs together: <nuts, vitamin E, source+nmod:of>, This is a<food, food, relation> tuple, which implies that "nuts is a source of vitamin E". Through this way, available relationships for the foods and foods that appear in the given plain text may be collected.

The extracted tuples may be used to form or update the knowledge graph 522, which is an example of the knowledge graph 254.

The tuples in the knowledge graph 522 may be transformed to question-answer pairs at 524. Taking a tuple<running, lean beef, suitable food>, which describes the relationship of "suitable food" between two entities of "running" (one sport name) and "lean beef" (one type of food), as an example, this tuple can be transformed to the following question-answer pairs:

Question=What is the suitable food for running? Answer=lean beef.

Question=Is lean beef suitable food for running? Answer=Yes, it is.

Question=What kind of sports is lean beef the suitable food? Answer=running.

In this way, one tuple may be automatically changed into a number of natural language style question-answer pairs. And the natural language style question-answer pairs may help supply natural language style answers in response to users' natural language style questions.

The question-answer pairs may be used to create or update the question-answer pair collection 528, which is an example of question-answer index 253.

For question-answer style websites such as documents for <sport, food menu recommendation>, <sport, disease resolution recommendation>, <sport, sport product recommendation>, question-answer pairs may be extracted from the documents at 526.

Figure 7:
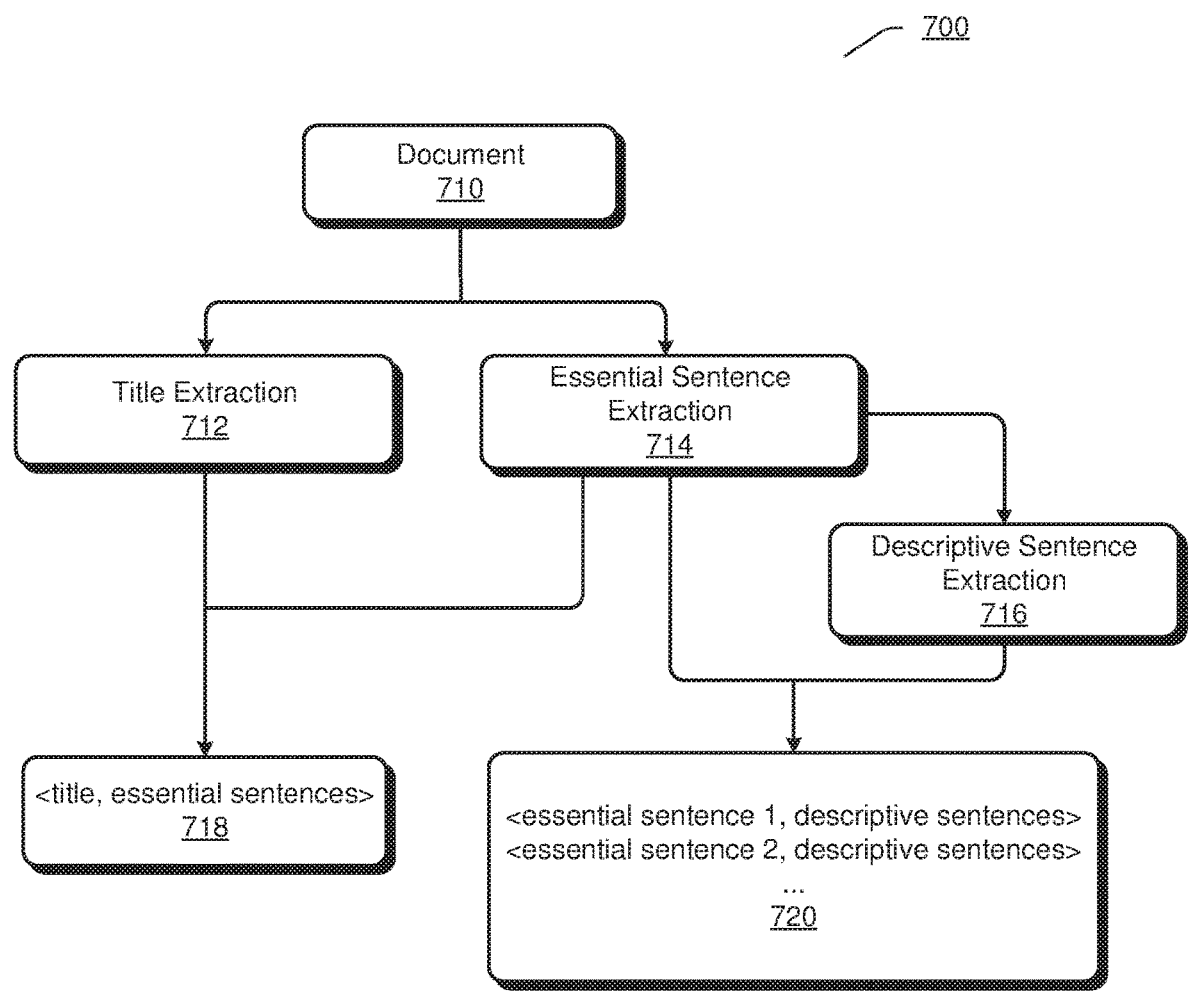
FIG. 7 illustrates an exemplary process for extracting question-answer pairs according to an embodiment.

FIG. 7 illustrates an exemplary process 700 for extracting question-answer pairs according to an embodiment. The process 700 may be employed at 526 of FIG. 5.

For fitness related question-answer pairs in a document of a web page, the answer may be a list of solutions and described by a list of paragraphs. A document summarization algorithm may be used to pick up the important points from the document with a question-style title. A document shown in the following table will be taken as an example.

TABLE 1 document 710
How to Run Faster

1. Figure out your current speed. (Make sure you stretch before you start to run.) Before you can increase your speed, it is important to know how fast you are currently running, so you can accurately measure your progress. Use a stopwatch to measure how long it takes you to run a mile. Once you have an exact time - whether it's 8 minutes or 16 minutes - you can work on improving it!
2. Find a good location. Find a local track or flat surface of about ¼ mile (400 meters) to run on. Tracks are an ideal place for beginner runners looking to increase their speed, as they are a standard length - 400 meters - which allows you to easily measure your progress. They are also traffic-free and flat.
. . .

In FIG. 7, an example document with a title of "how to run faster" is given at 710. In the content, there are two paragraphs, and each paragraph starts with an "essential" sentence for that paragraph. For the first paragraph, the essential sentence is "figure out your current speed" and followed by several sentences to describe this point. For the second paragraph, the essential sentence is "find a good location" and followed by several sentences to describe this point.

The title is extracted from the document at 712, and the essential sentences in the paragraphs are extracted at 714. The extracted essential sentences are an answer to the question of the title, so as to form a question-answer pair<title, essential sentences> at 718, which in this example may be <question=how to run faster, answer=Figure out your current speed, Find a good location . . . >.

"Descriptive" sentences may be extracted for each essential sentence from the corresponding paragraph at 716. The extracted descriptive sentences are an answer to the question of the essential sentence, so as to form a question-answer pair<essential sentence, descriptive sentences> at 720. In this example, the <essential sentence, descriptive sentences> pairs may be <Question=figure out your current speed, Answer=Use a stopwatch to measure how long it takes you to run a mile. Once you have an exact time—whether it's 8 minutes or 16 minutes—you can work on>, and <Question=find a good location, Answer=Find a local track or flat surface of about ¼ mile (400 meters) to run on>.

In some implementations, the plain texts of the question, such as "Question=figure out your current speed" and "Question=find a good location" may be converted into real questions "Question=how to figure out your current speed" and "Question=how to find a good location" by directly attaching "how" or "how to" at the beginning of the plain text style questions. When the beginning of the plain text is a verb, "how to" may be attached. Otherwise, "how" may be attached to the beginning of the plain text.

In an implementation, a document summarization model may be used to extract essential sentences for a title from a document at 714 and extract descriptive sentences for an essential sentence from a paragraph at 716.

In order to construct the training data for the document summarization model, the essential sentences are manually annotated in each paragraph of a document. That is, the selected sentences are assigned with a label of "1" and the remaining sentences are assigned with a label of "0". Then a gradient-boosting decision tree (GBDT) model is trained to score the sentences of a given document and then select the top-N essential sentences with the maximum scores as the final answer of the document. Similarly, for each paragraph, the GBDT model may be trained to select top-X descriptive sentences for each essential sentence of the paragraph.

For a sentence in a document, the following features may be used in the GBDT model:

Is the sentiment analysis (SA) label of current sentence similar with the (average) SA label of the document?

The number of words that are shared by current sentence and the title of the document, and the accumulated TF-IDF (term frequency-inverse document frequency) scores of the shared words. The TF of a word indicates the term frequency of the word in the document, and the IDF of the word indicates how many sentences in the document contain the word.

The number of words that are shared by current sentence and the sentences that are already in the summarization, and the accumulated TF-IDF scores of the shared words.

The length of current sentence (e.g., the number of words).

The length difference between current sentence and the average length of the sentences in the document.

The length difference between current sentence and the average length of the sentences in current summarization (e.g., with one or two sentences).

The (maximum and averaged) word2vec similarity between the words in current sentence and the words in the title of the document.

The (maximum and averaged) word2vec similarity between the words in current sentence and the words in current summarization.

The weights of the features in the GBDT are determined during training of the GBDT by using the training data. Once trained, the GBDT may be used to extract the essential sentences for a title from the whole document, and may be used to extract descriptive sentences for an essential sentence from a paragraph. When extracting descriptive sentences for an essential sentence from a paragraph, the paragraph is treated as the "document" and the essential sentence is treated as "title" in the features.

In an implementation, when extracting essential sentences for a title from a document, it may predefine that no more than one essential sentence is extracted from one paragraph, and it is possible that no essential sentence is extracted from one specific paragraph. In another implementation, more than one essential sentence may be extracted from one paragraph, and it is possible that no essential sentence is extracted from one specific paragraph. Therefore, one essential sentence is not necessarily corresponding to one paragraph, and may be corresponding to a partial paragraph or more than one paragraph. In such case, the descriptive sentences are extracted for the essential sentence from the document portion corresponding to the essential sentence.

The question-answering module 264 may generate a response message for a user's query based on the question-answer pair collection 528. In an implementation, the question-answering module 264 may employ a learn-to-rank (LTR) algorithm that ranks answer candidates given user's specific query.

Latent semantic features which compare a query and a candidate question-answer pair in a dense vector space may be employed in the LTR.

In an implementation, "dependency arc matching" score may be used as a feature in the LTR algorithm. Taking a user query "what should runners eat?" as example, the dependency tree 600c of this sentence is illustrated in FIG. 6C. Taking the sentence "Runner should eat a small handful of almonds at least three to five times per week" as example, its dependency tree 600A is illustrated in FIG. 6A. The similarity of the two sentences may be computed by comparing the arcs of their dependency trees 600A and 600C.

The comparison of the arcs may be performed based on the text strings. For example, the dependency arcs "runners-nsubj-eat" is same in the two dependency trees, and so is the dependency arcs "should-aux-eat".

The comparison of the arcs may be performed through latent vector spaces by projecting the arcs into dense space vectors and then computing their similarity by functions such as cosine scores of the two vectors from two dependency arcs.

Figure 8:
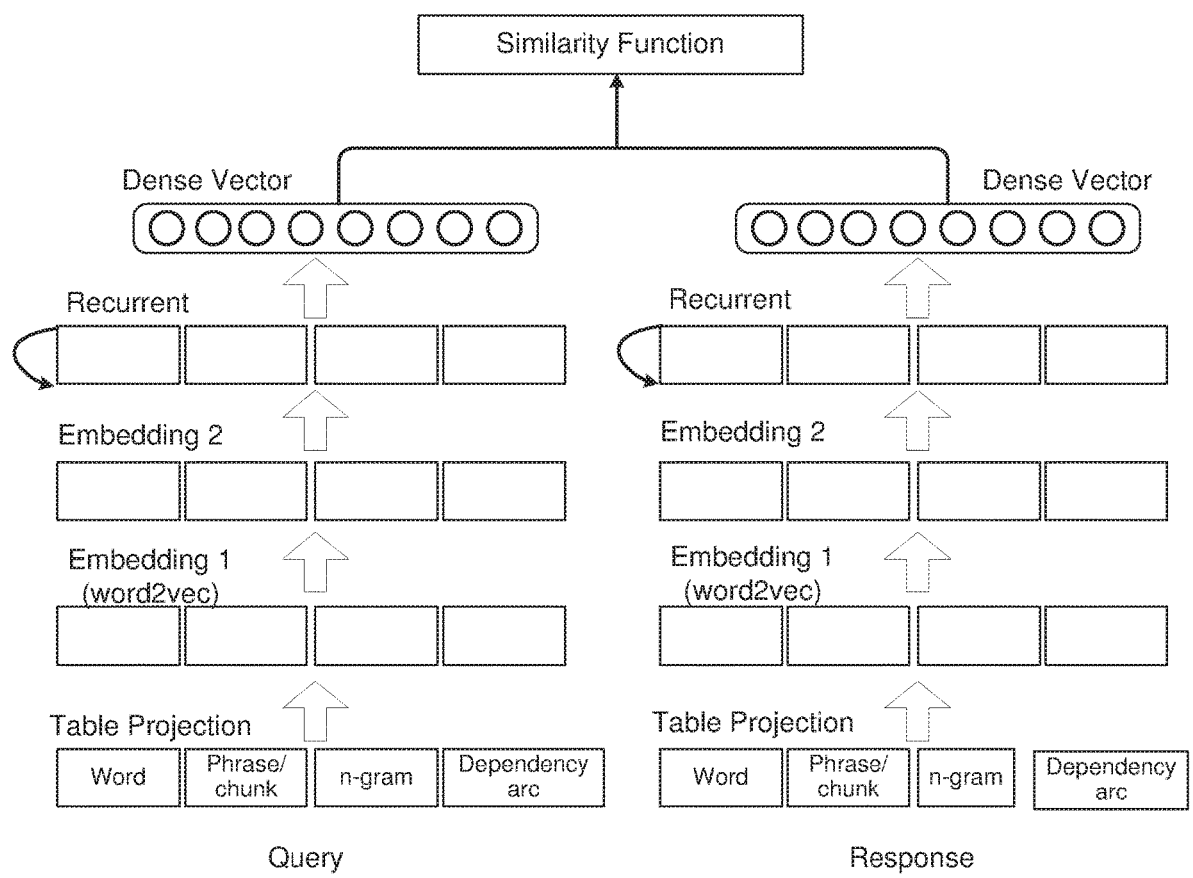
FIG. 8 illustrates an exemplary latent semantic similarity model according to an embodiment.

FIG. 8 illustrates a latent semantic similarity model 800 according to an embodiment.

The latent semantic similarity model 800 is implemented by a recurrent neural network (RNN) with gated recurrent units (GRU). The RNN-GRU takes variant basic units such as words, n-gram phrases, chunks, and dependency arcs as input. It should be appreciated that the RNN-GRU may also take one or more of the words, n-gram phrases, chunks, and dependency arcs as input unit. And the RNN-GRU encoding projects a sequence of the basic input units into a dense vector space through the table projection layer, embedding 1 layer, embedding 2 layer and recurrent layer. The resulted dense vector is a latent semantic representation of the sequence.

After obtaining the dense vectors of the query and a candidate sentence, the similarity score between the both may be computed by the similarity function, an example of the similarity function may be a cosine score of the two vectors.

It should be appreciated that any RNN-GRU encoding method may be employed in the latent semantic similarity model 800, and the employing of dependency arc of a sentence as the input unit may provide an additional dimension for purpose of improving the performance of the similarity matching.

In an implementation, the question-answering module 264 is implemented as a LTR model, which is used to rank<question, answer> pairs with respect to a given query from a user, and select available responses such as answers in the candidate<question, answer> pairs directly and send them to the end users.

In an implementation, the LTR model employs a GBDT algorithm, and the following features may be utilized in the GBDT ranking a candidate question-answer pair.

Implicit/explicit dependency arc similarity score between the dependency trees of the query and the candidate question. The explicit dependency arc similarity score is obtained based on the text string level comparison of the arcs as described above. The implicit dependency arc similarity score is obtained based on the dense space vector level comparison of the arcs as described above.

Implicit/explicit dependency arc similarity score between the dependency trees of the query and the candidate answer.

Frequency of the user's and other user's positive feedbacks for the candidate answer.

Language model for information retrieval with respect to the query q and the candidate question Q Given a query q and a candidate question Q, this feature measures the relevance between q and Q through:

$$P(q|Q)=\Pi_{w\in q}[(1-\lambda)P_{ml}(w|Q)+\lambda P_{ml}(w|C)] \qquad \text{Equation (1)}$$

where $P_{ml}(w|Q)$ is the maximum likelihood of word w estimated from Q, and $P_{ml}(w|C)$ is a smoothing item that is computed as the maximum likelihood estimation in a large-scale corpus C. Here the corpus C may be the question-answer pair collection. The smoothing item avoids zero probability, which stems from those words appearing in the candidate Q but not in the message q. The $\lambda$ is a parameter that acts as a trade-off between the likelihood and the smoothing item, where $\lambda\in(0, 1)$. This feature works well when there are a number of words overlapped between the query and the candidate question.

Language model for information retrieval with respect to the query q and the candidate answer A. This language model similarity score between the query and a candidate answer is also computed using equation (1) by taking the answer A as the Q in the equation (1).

Translation-based language models with respect to the query q and the candidate question Q This feature learns word-to-word and/or phrase-to-phrase translation probability from, such as, question-answer pairs, and incorporates the learned information into maximum likelihood.

Given the query q and the candidate question Q, translation-based language is defined as:

$$P_{trb}(q|Q)=\Pi_{w\in q}[(1-\lambda)P_{mx}(w|Q)+\lambda P_{ml}(w|C)] \qquad \text{Equation (2)}$$

$$P_{mx}(w|Q)=\alpha P_{ml}(w|Q)+\beta P_{tr}(w|Q) \qquad \text{Equation (3)}$$

$$P_{tr}(w|Q)=\Sigma_{v\in Q}P_{tp}(w|v)P_{ml}(v|Q) \qquad \text{Equation (4)}$$

Here $\lambda$, $\alpha$ and $\beta$ are parameters satisfying $\lambda\in(0, 1)$ and $\alpha+\beta=1$. $P_{tp}(w|v)$ is a translation probability from word v in Q to word w in q.

Translation-based language models with respect to the query q and the candidate answer A. This language model similarity score between the query and the candidate answer is also computed using equations (2)-(4) by taking the answer A as the Q in the equations (2)-(4).

Edit distance between the query and the candidate question in a word or character level.

Maximum subsequence ratio between the query and the candidate question.

RNN-GRU

An example of the RNN-GRU is shown in FIG. 8. The RNN-GRU may take at least one of the word, phrase, n-gram, and dependency arc as input units, so as to compute the similarity score between the query and the candidate question, and compute the similarity score between the query and the candidate response. Both the similarity scores may be used as a feature of the GBDT.

It should be appreciated that more or less features may be used in the GBDT in different implementations.

Figure 9:
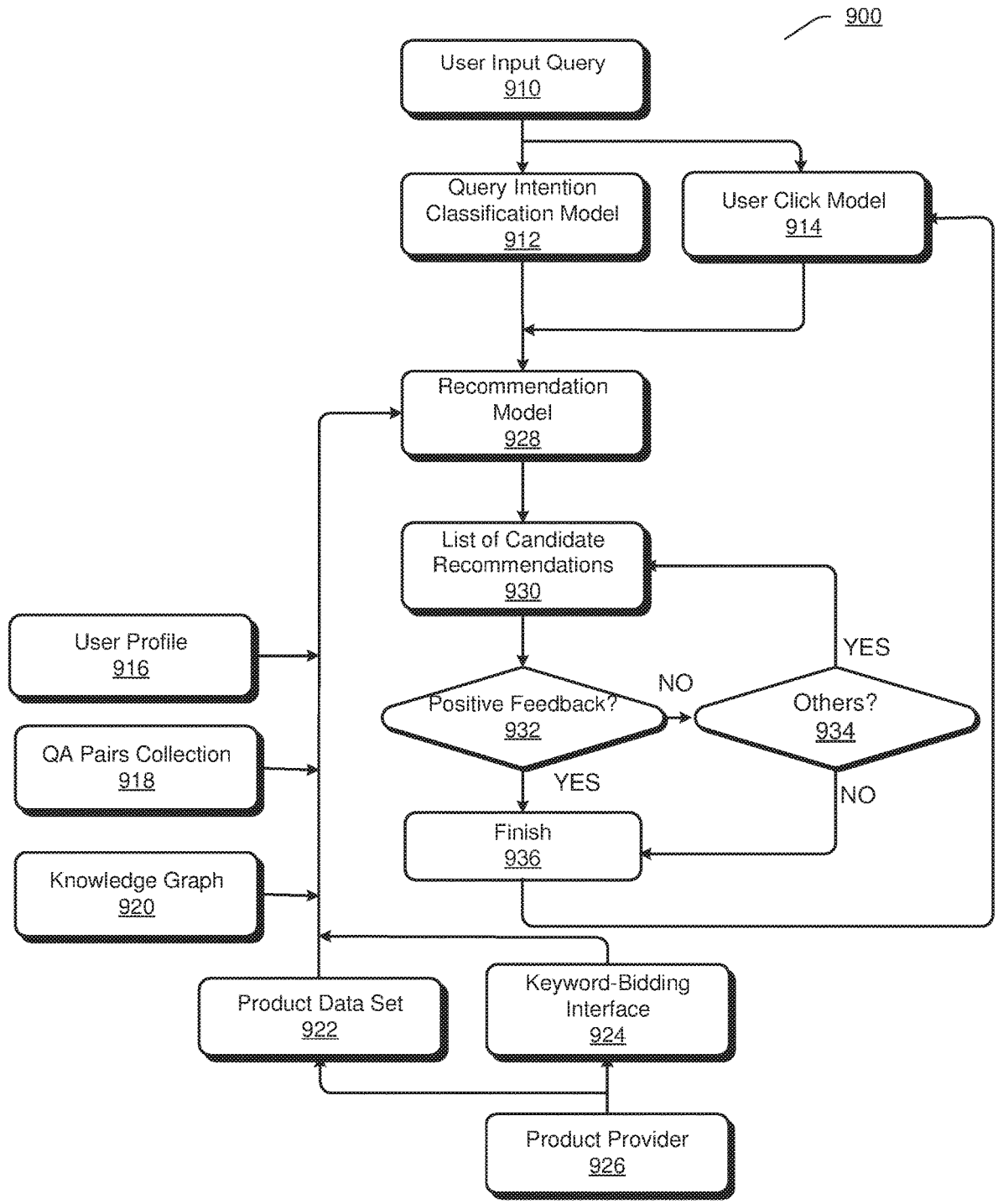
FIG. 9 illustrates an exemplary process for fitness-related recommendation according to an embodiment.

FIG. 9 illustrates an exemplary framework 900 for fitness product recommendation according to an embodiment.

A user query is input at 910. The user input may be in text, voice or image formats. The voice or image message may be converted to text message by the API modules 244 and 246 as described above. Therefore the following description takes text message as example.

A query intention classification model 912 takes text query as input and predicates the user's consumption intention. For example, a plurality of intentions may be predefined, examples of the intentions may include fitness clothing requirement, fitness equipment requirement, fitness food requirement, disease recovering requirement, diet food requirement, and so on. When the intention classification model 912 classifies the query as one of the predefined intentions, the recommendation model 928 may operate to provide candidate recommendations.

The user click model 914 predicts Click-Through-Rate (CTR) of candidate recommendations such as candidate products to the specific query. The input for this user click model may be <user id, user historical click record, user profile, historical queries, current query> and the target is to predicate the CTRs of candidate recommendations to the query.

The product provider 926 may supply the product data set 922 and may bid matching keywords through the bidding interface 924.

The user intention output from 912, the CTRs of candidate recommendations output from 914, the product data set 922, the bidding information, as well as user profile 916, question-answer pair collection 918 and knowledge graphs 920 may be taken as input of the recommendation model 928 to rank out a list of candidate recommendations 930. Where the user profile 916, question-answer pair collection 918, knowledge graphs 920 and recommendation model 928 may be examples of the user profile 256, question-answer index 253, knowledge graphs 255 and recommendation module 262. The user profile 916 may include gender, age, active space, concerned fitness information of the user, and such information may be extracted from the user log data.

A candidate recommendation with the highest ranking score may be output firstly to the user. If a positive feedback is received from the user, as shown in the YES branch of 932, the recommendation process is finished at 936. If a negative feedback is received from the user, as shown in the NO branch of 932, it is checked whether there remains other candidate recommendations in the list at 934. If YES at 934, the next candidate recommendation with the next highest ranking score is output to the user, and if NO at 934, the recommendation process is finished at 936. As an alternative way, if NO at 934, the user may be notified that there is no suitable candidate recommendation to the query and such result may be stored. Also a feedback may be generated based on such result and provided to the product provider, such that the product provider may know there is a possible need to improve its product list or develop new product. Then the user's click actions to the respective candidate recommendations are transferred to the user click model 914, and accordingly the user click model 914 may update the historical user click record with the user's click actions. An example of a user click record of one product may be the number of positive feedbacks and the number of negative feedbacks of the user to the product.

The user intention classification model 912 may take the user's current query as input and refer to historical user log as well as user profile information such as user's age, gender, location, fitness preference as references for feature constructing. A support vector machine (SVM) model may be used to implement the user intention classification model 912. The output of the SVM model includes a set of user's intentions, such as "muscle building", "weight losing", "recover after operation", "healthy food seeking", "sport clothing requirement", "sport equipment requirement", "sport service requirement", "sport place requirement" and so on. It should be appreciated that the tagged intentions are not limited to those illustrated, and more or less intentions may be tagged in the training of the SVM in different implementation.

In an implementation, the following features may be used in the SVM model for training a nonlinear relationship between <query, user log, user profile> and a set of user's intentions.

User profile, such as gender, age, concerned fitness information, and active places.

User click model's output, that is, the CTR predication of recommendation candidates.

Word ngrams such as unigrams and bigrams for words in the query. This is a string based feature. The matching between the query and the candidate recommendation is performed in units of the word ngrams.

Character ngrams. This is also a string based feature. For each word in the query, character ngrams are extracted to perform the string based matching between the query and the candidate recommendation. For example, 4-grams and 5-grams are used as the string based matching unit. The character ngrams is particularly advantages for Asian language such as Chinese and Japanese.

Word skip-grams. For all the trigrams and 4-grams in the query, one of the words is replaced by a symbol to indicate the presence of non-contiguous words.

Brown cluster ngrams. Brown clusters are used to represent words in query, and then unigrams and bigrams are extracted as features.

Part-of-speech (POS) tags. The presence or absence of part-of-speech tags are used as binary features.

Social network related words. For example, number of hashtags, emoticons, elongated words, and punctuations in the query are used as features.

Word2vec cluster ngrams. The word2vec tool (Mikolov et al., 2013) may be used to learn 100-dimensional word embedding from a social network dataset. Then, K-means algorithm and L2 distance of word vectors may be used to cluster the million-level vocabulary into 200 classes. The classes are used to represent generalized words in the query.

Number of words in the query that are also included in the disease dictionary.

Number of words in the query that are also included in the sport training dictionary.

Number of words in the query that are also included in the food related dictionary.

User's emotion/opinion to the specific topics based on user log's sentiment analysis.

It should be appreciated that the above discussed features for the SVM model are illustrative rather than limitative, there may be more or less features to be used for the SVM model The user click model may predict CTR of candidate products to specific queries. The input for this user click model may be <user id, user historical click record, user profile, current query> and the output is to predicate the CTRs of candidate products to the query.

As illustrated by the arrow from the "Finish" block 936 to the user click model 914 in FIG. 9, users' click behaviors to products are updated online. The user click model 914 stores the historical user click records and retrains itself during given time interval, such as one retraining per day, per week and so on.

In an implementation, a logistic regression model may be trained using the following features to implement the user click model 914. The logistic regression model is advantageous for it's easy to be trained/retrained and fast decoding speed.

User profile, such as gender, age, concerned fitness information, and active places.

User's historical click record, an exemplary format of the record is <user id, product, click count>, or <user id, recommendation, click count>.

Word ngrams, such as unigrams and bigrams for words in the query.

Character ngrams. For each word in the query, character ngrams are extracted.

Word skip-grams. For all the trigrams and 4-grams in the query, one of the words is replaced by a symbol to indicate the presence of non-contiguous words.

Brown cluster ngrams. Brown clusters are used to represent words in query, and then unigrams and bigrams are extracted as features.

Part-of-speech (POS) tags. The presence or absence of part-of-speech tags are used as binary features.

Social network related words. For example, number of hashtags, emoticons, elongated words, and punctuations in the query are used as features.

Word2vec cluster ngrams. The word2vec tool (Mikolov et al., 2013) may be used to learn 100-dimensional word embedding from a social network dataset. Then, K-means algorithm and L2 distance of word vectors may be used to cluster the million-level vocabulary into 200 classes. The classes are used to represent generalized words in the query.

It should be appreciated that the above discussed features for the logistic regression model are illustrative rather than limitative, there may be more or less features to be used for the logistic regression model.

The recommendation model 928, specifically relevance-based recommendation model, may be constructed by using a learning-to-rank (LTR) architecture. The recommendation model 928 is to rank available recommendations such as products with their providers to a specific user under a specific query. A gradient boosting decision tree (GBDT) is trained for the ranking. In an implementation, the following features may be used for the GBDT.

Query intension classification model's output, that is, the query intentions and their probabilities.

User profile, such as gender, age, concerned fitness information, and active places.

User click model's output, that is, the CTR predication of recommendation candidates.

Keyword-bidding data, such as bidding price of keywords related to a recommendation candidate.

Word ngrams such as unigrams and bigrams for words in the query.

Character ngrams. For each word in the query, character ngrams are extracted to perform the string based matching between the query and the candidate recommendation.

Word skip-grams. For all the trigrams and 4-grams in the query, one of the words is replaced by a symbol to indicate the presence of non-contiguous words.

Brown cluster ngrams. Brown clusters are used to represent words in query, and then unigrams and bigrams are extracted as features.

Part-of-speech (POS) tags. The presence or absence of part-of-speech tags are used as binary features.

Social network related words. For example, number of hashtags, emoticons, elongated words, and punctuations in the query are used as features.

Word2vec cluster ngrams.

Figure 10:
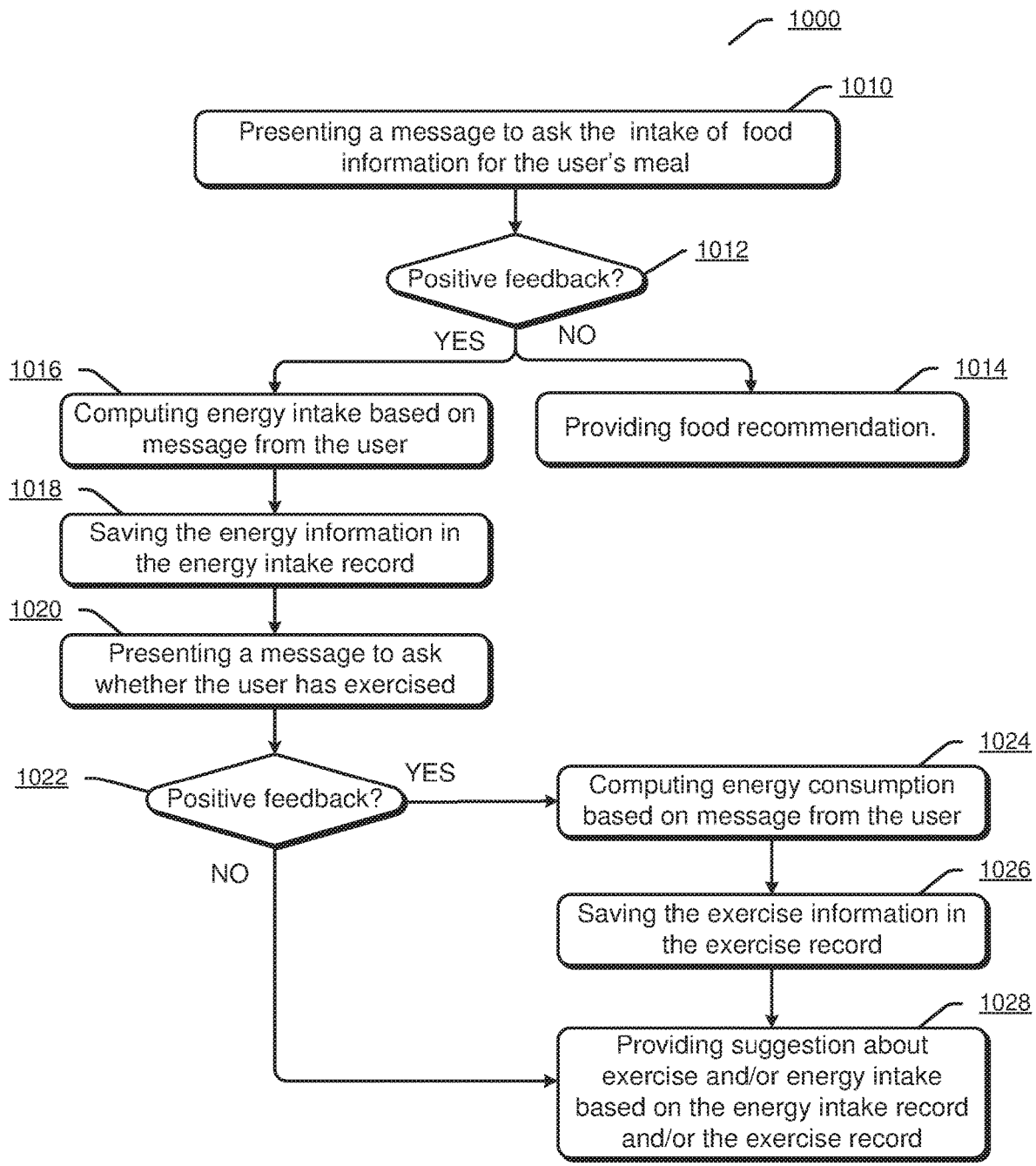
FIG. 10 illustrates an exemplary process for fitness assistance through automated chatting according to an embodiment

It should be appreciated that the above discussed features for the GBDT model are illustrative rather than limitative, there may be more or less features to be used for the GBDT model FIG. 10 illustrates an exemplary process 1000 for fitness assistance through automated chatting according to an embodiment.

The chatbot may proactively ask the user to provide energy intake information at 1010. For example, as illustrated in FIGS. 4C and 4E, a message "What did you have for supper?" may be presented to the user.

If the chatbot receives a negative feedback from the user at 1012, for example, the negative feedback may be "not have supper yet" as illustrated in FIG. 4E, the chatbot may take this opportunity to provide a food recommendation for the user. The recommendation module 262 or 928 may be used to provide the food recommendation. It should be appreciated that, the recommendation is not necessarily to be product such as restaurant or food, it's may also be a food menu or recipe coming from web or other users.

If the chatbot receives a positive feedback from the user at 1012, for example, the positive feedback may be "I had about 200-gram rice, 500-gram beef, and 50-gram Broccoli" as illustrated at 412C in FIG. 4C, the chatbot may calculate the energy intake amount of the user based on the information of the user input message at 1016, and record the energy intake amount in the energy intake record of the user at 1018. In an implementation, the food types and the energy intake amount are saved together in the energy intake record. Any methods may be used to compute energy amount of food based on the text message. For example, a lexicon of food-energy relation may be predefined, and the energy amount of the food may be calculated based on the lexicon.

Another example of the positive feedback may be an image message such as the image shown at 410D in FIG. 4D. Any methods may be used to compute energy amount of food based on the image message. For example, a 2D convolutional neural network (CNN) such as AlexNet deep CNN network may be used to compute the energy amount of food based on the image message.

In an implementation, a region of interest (ROI) classification model may be implemented by using an AlexNet deep CNN network. The ROI classification model may be trained by using the <image, image with ROI marked> pairs, where the image is used as the input of the ROI classification model, and the image with ROI marked is used as the output of the ROI classification model. The ROI classification model, which is trained with food images, may extract the ROIs corresponding to different food types of a food shown in the image.

An energy prediction model may be implemented by using another AlexNet deep CNN network. The energy prediction model may be trained by using the <food-related image, energy value> pairs, where the image, which preferably shows one kind of food, is used as the input of the energy prediction model, and energy value is used as the output of the energy prediction model. The energy prediction model, which is trained with <food-related image, energy value> pairs, may predict the energy value of a ROI corresponding to one type of food.

For a food-related image such as the one at 410D in FIG. 4D, the ROI classification model may take the food-related image as input and extract ROIs corresponding to the different food, and then the energy prediction model may take each of the ROIs as input and predict the energy amount of the food corresponding to the ROI. Then the energy corresponding to the ROIs may be accumulated to obtain the energy amount of the food shown in the image.

In an implementation, if the chatbot fails to compute the energy amount based on the food-related image at 1016, the chatbot may output a message asking the user to provide the food information in text message or speech message.

The chatbot may then proactively output a message to ask for the exercise information of the user at 1120. For example, a message "Did you have exercise today?" at 416C in FIG. 4C may be presented to the user.

If the chatbot receives a negative feedback from the user at 1022, for example, the negative feedback may be "not yet" as illustrated at 418C in FIG. 4C, the chatbot may provide suggestion about exercise and/or energy intake based on the energy intake record and/or the exercise record at 1028. For example, "It seems you have had too much energy today. 40-minute jogging is good for you. Go out and do it" as illustrated at 420C, in which both energy intake suggestion and exercise suggestion are provided. It should be appreciated that the chatbot's comments on the energy and exercise that have been taken by the user are also an energy intake suggestion and exercise suggestion.

In other implementations, it is possible that only exercise suggestion is provided based on the exercise record. For example, a muscular exercise may be suggested by the chatbot based on the exercise record which indicates the user omitted several times of muscular exercise.

It is possible that only exercise suggestion is provided based on the energy intake record. For example, an aerobic exercise may be suggested by the chatbot based on the energy intake record which indicates the user currently takes too much energy.

It is possible that only energy intake suggestion is provided based on the energy intake record. For example, a food recipe with low-calorie may be suggested by the chatbot based on the energy intake record which indicates the user takes too much energy.

It is possible that only energy intake suggestion is provided based on the exercise record. For example, food such as a handful of almonds may be suggested by the chatbot based on the exercise record which indicates the user just finished aerobic exercise, where a handful of almonds is a good nutrition supplement for aerobic exercise.

If the chatbot receives a positive feedback from the user at 1022, for example, the positive feedback may be "I had swimming for 1000 meters in half an hour" as illustrated at 422E in FIG. 4E, the chatbot may calculate the energy consumed by user based on the message received from the user at 1024, and record the energy consumption amount in the exercise record at 1026. In an implementation, the exercise and the energy consumption amount are saved together in the exercise record. Any methods may be used to compute energy consumption amount of exercise based on the text message. For example, a lexicon of exercise-energy relation may be predefined, and the energy consumption amount of the exercise may be calculated based on the lexicon.

Figure 11:
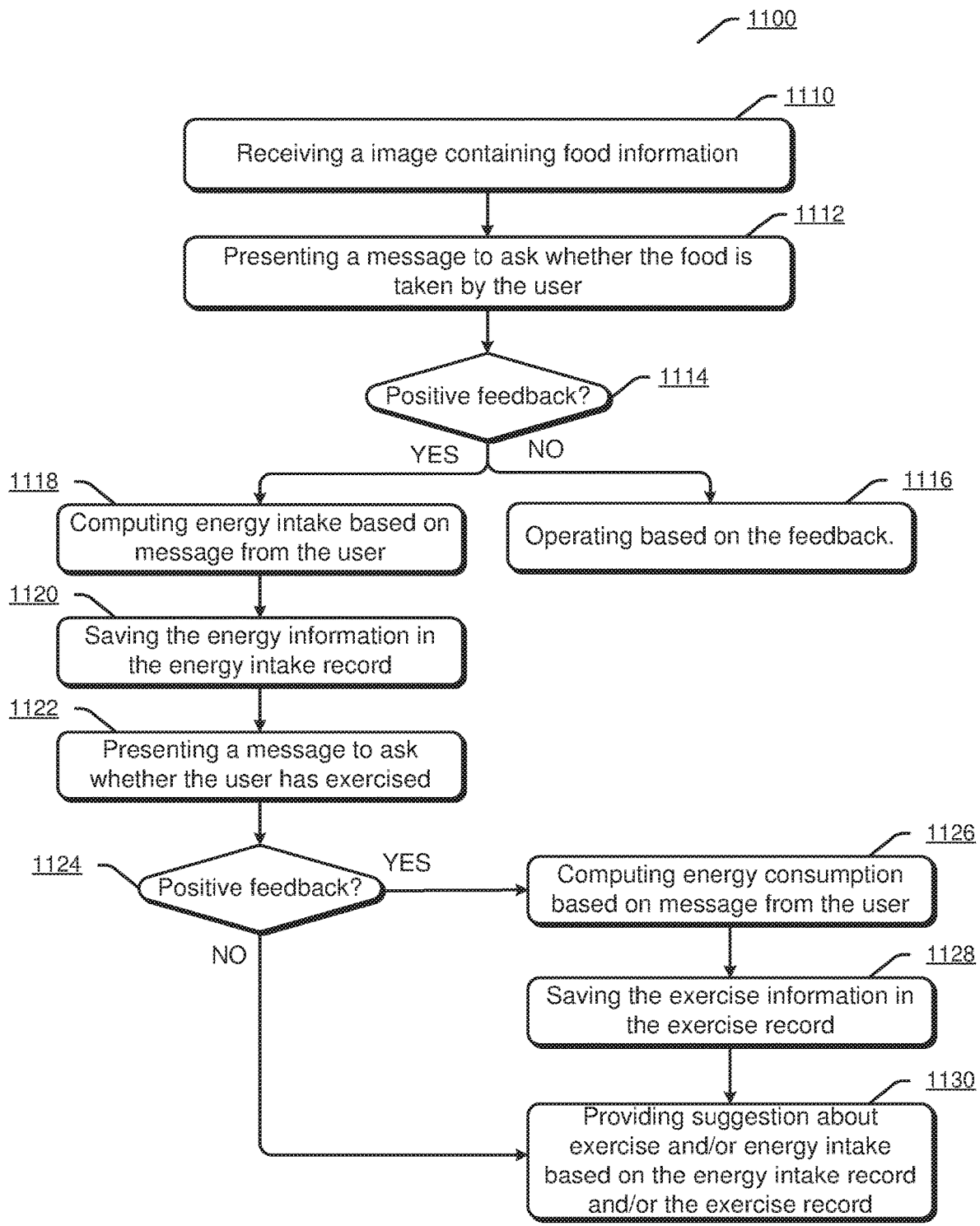
FIG. 11 illustrates an exemplary process for fitness assistance through automated chatting according to an embodiment

FIG. 11 illustrates an exemplary process 1100 for fitness assistance through automated chatting according to an embodiment.

The chatbot may receive a food-related image from the user at 1110. For example, the food-related image at 410D in FIG. 4D may be sent by the user.

In this case, it's difficult for the chatbot to determine whether the user input image shows the food taken by the user. The chatbot present a message to ask whether the food is taken by the user at 1112. For example, as illustrated at 412D in FIG. 4D, a message "Is that your lunch?" may be presented to the user at 1112.

If the chatbot receives a negative feedback from the user at 1114, the chatbot may operate based on the feedback at 1116.

If the chatbot receives a positive feedback from the user at 1114, the process goes to 1118. The operations at 1118 to 1130 are similar to the operations at 1016 to 1028 in FIG. 10, and thus are not described in detail.

Figure 12:
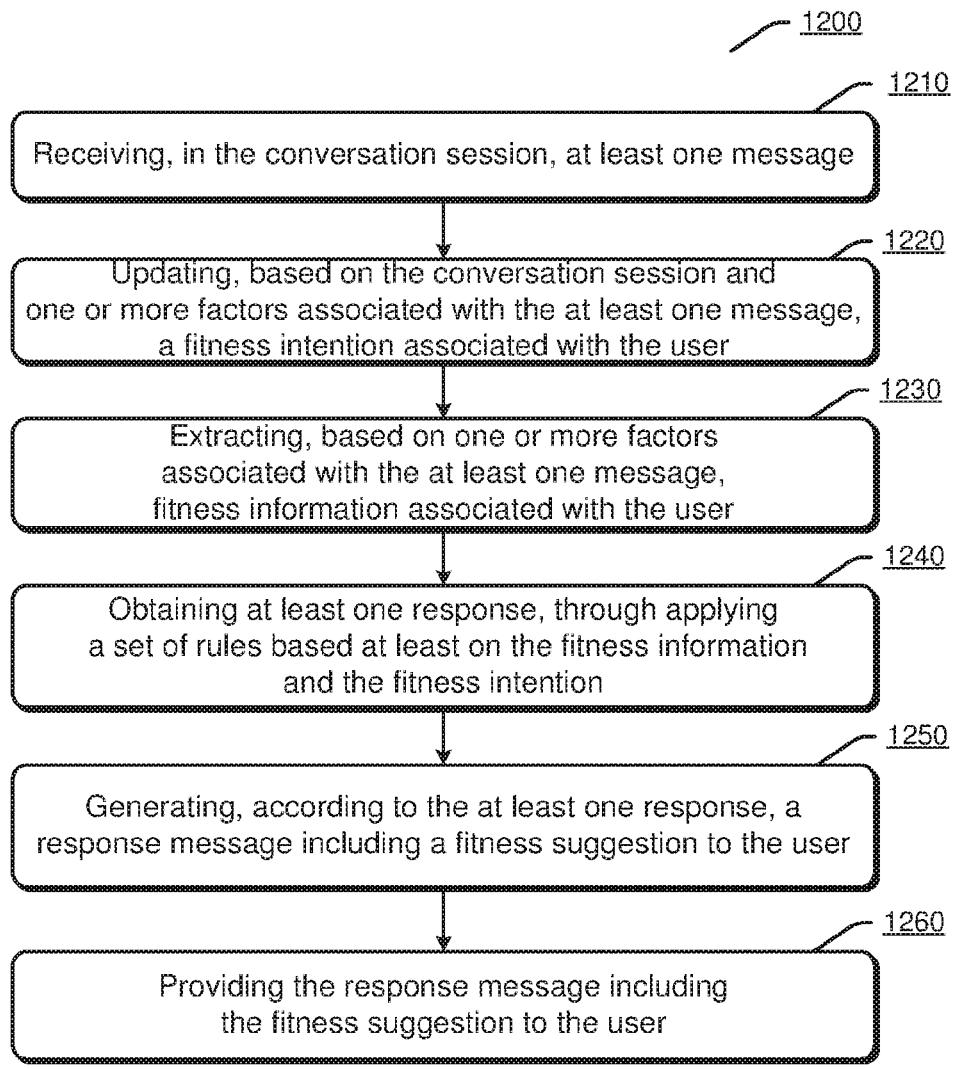
FIG. 12 illustrates an exemplary process for fitness assistance through automated chatting according to an embodiment

FIG. 12 illustrates an exemplary method 1200 for fitness assistance to a user in a conversation session according to an embodiment.

At 1210, at least one message is received from a user in a conversation session, wherein the conversation session is between the user and an electronic conversational agent. At 1220, a fitness intention associated with the user is updated based on the conversation session and one or more factors associated with the at least one message. At 1230, fitness information associated with the user is extracted based on one or more factors associated with the at least one message. At 1240, at least one response is obtained through applying a set of rules on the fitness information and the fitness intention. At 1250, a response message including a fitness suggestion to the user is generated according to the at least one response. At 1260, the response message including the fitness suggestion is provided to the user.

Here some rules are given as examples.

As for an exemplary intention of losing weight: if the chatbot receives a message as "I ate three big hamburgers for my lunch" and/or "I haven't taking any exercise today," and judges that the fitness intention of the user is "losing weight" during the conversation session, then the chatbot may extract the fitness information as "three big hamburgers for lunch" and/or "no exercise" and determine that the fitness information of the user is not compliant with or does not facilitate the achievement of the fitness intention of the user, therefore, the chatbot may give a fitness suggestion as "It seems you have had too much calories today. You should not eat much for supper and should take 40-minute jogging." Alternatively, if the chatbot receives a message as "I ate 200-gram rice, 500-gram beef and 50-gram broccoli for my lunch" and/or "I had swum 1000 meters in half an hour" and judges that the fitness intention of the user is "losing weight" during the conversation session, then the chatbot may extract the fitness information as "200-gram rice, 500-gram beef and 50-gram broccoli for lunch" and/or "swimming 1000 meters" and determine that the fitness information of the user is compliant with or facilitates the achievement of the fitness intention of the user, therefore, the chatbot may give a fitness suggestion as "You have healthy diet today" and/or "You've had enough exercise today and don't eat too much for supper", or "Good, just keep similar diet and/or exercise." As another way, if the chatbot receives a message as "I ate 200-gram rice, 500-gram beef and 50-gram broccoli for my lunch" and/or "I haven't taking any exercise today" and judges that the fitness intention of the user is "losing weight" during the conversation session, then the chatbot may extract the fitness information as "200-gram rice, 500-gram beef and 50-gram broccoli for lunch" which is determined as compliant with or facilitating the achievement of the fitness intention of the user, and/or "no exercise" which is determined as not compliant with or not facilitating the achievement of the fitness intention of the user, therefore, the chatbot may give a fitness suggestion as "You have healthy diet today" and/or "You may have a small handful of nuts in the afternoon" and/or "You may have 40-minutes jogging."

As for an exemplary intention of muscle building: if the chatbot receives a message as "I have nothing (or just some vegetables and/or fruits) today" and/or "I haven't taken any exercise today" and judges that the fitness intention of the user is "muscle building" during the conversation session, then the chatbot may extract the fitness information as "eat nothing or a little" and/or "no exercise" and determine that the fitness information of the user is not compliant with or does not facilitate the achievement of the fitness intention of the user, therefore, the chatbot may give a fitness suggestion as "It seems you have had too little energy today, and you should eat some beef, or eggs, or chicken breast and take some muscle exercise, such as 20 push-ups per round, 3 rounds and 30 sit-ups per round, 3 rounds." Alternatively, if the chatbot receives a message as "I ate 200-gram eggs, 500-gram beef and 200-gram bread for my lunch" and/or "I have taken muscle exercise for 2 hours" and judges that the fitness intention of the user is "muscle building" during the conversation session, then the chatbot may extract the fitness information as "200-gram eggs, 500-gram beef and 200-gram bread for lunch" and/or "muscle exercise for 2 hours" and determine that the fitness information of the user is compliant with or facilitates the achievement of the fitness intention of the user, therefore, the chatbot may give a fitness suggestion as "You have enough protein today" and/or "You've had enough exercise today and don't eat too much fat for supper", or "Good, just keep similar diet and/or exercise." As another way, if the chatbot receives a message as "I ate 200-gram eggs, 500-gram beef and 200-gram bread for lunch" and/or "I haven't taken any exercise today" and judges that the fitness intention of the user is "muscle building" during the conversation session, then the chatbot may extract the fitness information as "200-gram eggs, 500-gram beef and 200-gram bread for lunch" which is determined as compliant with or facilitating the achievement of the fitness intention of the user, and/or "no exercise" which is determined as not compliant with or not facilitating the achievement of the fitness intention of the user, therefore, the chatbot may give a fitness suggestion as "You have healthy diet today" and/or "You should have a small handful of nuts in the afternoon" and/or "You should take muscle exercise plan for 2 hours today."

As for an exemplary intention of product interest: if the chatbot receives a message as "How can I run faster" and judges that the fitness intention of the user is "product interest" during the conversation session, then the chatbot may extract the fitness information as "run faster" and use such fitness information, fitness intention, user profile and some other features as input of a recommendation model to obtain information about the most suitable product, therefore, the chatbot may give a fitness suggestion as "The shoes New Balance Fresh Foam Zante v3 and the Nike running clothes are beneficial for running faster." Alternatively, if the chatbot finds there is no suitable product for running faster, that is, the recommendation model outputs "None", then the chatbot may give a response message as "there is no suitable product for running faster for you" and/or "Are you interested in swimming clothes which are good for swimming faster" and/or "Are you interested in running techniques beneficial for running faster?" and may provide a feedback to the product provider to let the product provider know that there is a possible need to improve its product list or develop new product.

The rules for an exemplary intention of service requirement may be similar to that for the intention of product interest. Thus, for simplicity, particular examples for the service requirement are omitted here.

As for no intention, for example, just question-answer form: if the chatbot receives a message as "Is there any restaurant nearby?" and judges that the user has no intention during the conversation session, then the chatbot may extract the keywords as "restaurant," "nearby", match such keywords with candidate answers in the question-answer index and/or the knowledge graph, select a candidate answer which has a highest matching score and give an answer as "There is a McDonald's 100 meters in front of you" regardless of such restaurant being good for fitness or not.

It should be appreciated that the above discussed examples for the rules are illustrative rather than limitative, and there may be any other kinds of rules to be applied for the method of fitness assistance to a user in a conversation session.

In an implementation, the one or more factors include at least one of energy information, exercise information, and product information.

In an implementation, the method further comprises: presenting, based at least on the fitness intention and the fitness information, another message for tracking an achievement of the fitness intention at periodic time or at predefined time.

In an implementation, the fitness intention indicates at least one of fitness plan, product interest, service requirement and no intention.

In an implementation, the fitness information includes at least one of energy intake information, energy consumption information, type of exercise, health condition and sport equipment.

In an implementation, the fitness suggestion includes at least one of increasing energy intake, reducing energy intake, taking more exercise, taking less exercise, relaxing, a product related to fitness, and a service related to fitness.

In an implementation, the fitness suggestion is obtained through ranking a plurality of candidate recommendations based on at least one of: a user profile, click-through-rates of the plurality of candidate recommendations with respect to the at least one message, energy intake record, exercise record, keyword-bidding information of the plurality of candidate recommendations, a knowledge graph related to fitness, a question-answer pair collection related to fitness, and a product data set.

In an implementation, the at least one message comprises at least one of text message, speech message and image message.

In an implementation, the at least one message comprises an image message. The operation of extracting the fitness information further comprises: identifying one or more regions of interest (ROI) in the image message; estimating energy amount for each ROI; and obtaining the fitness information, by accumulating the estimated energy amount for each ROI.

In an implementation, the operation of obtaining the at least one response is further based at least on dependency arc similarity between the at least one message and candidate responses in a question-answer pair collection.

In an implementation, the question-answer pair collection is generated through the following operations: performing dependency parsing on at least one sentence in a web page, extracting at least one tuple based on the dependency parsing, transforming the at least one tuple to at least one question-answer pair and including the at least one question-answer pair in the question-answer pair collection.

In an implementation, the question-answer pair collection is generated through the following operations: extracting a title and at least one essential sentence from a document in a web page, extracting at least one descriptive sentence corresponding to each essential sentence from a part of the document that is related to the essential sentence, generating question-answer pairs based on the title and the at least one essential sentence, and/or based on each essential sentence and at least one corresponding descriptive sentence and including the question-answer pairs in the question-answer pair collection.

Figure 13:
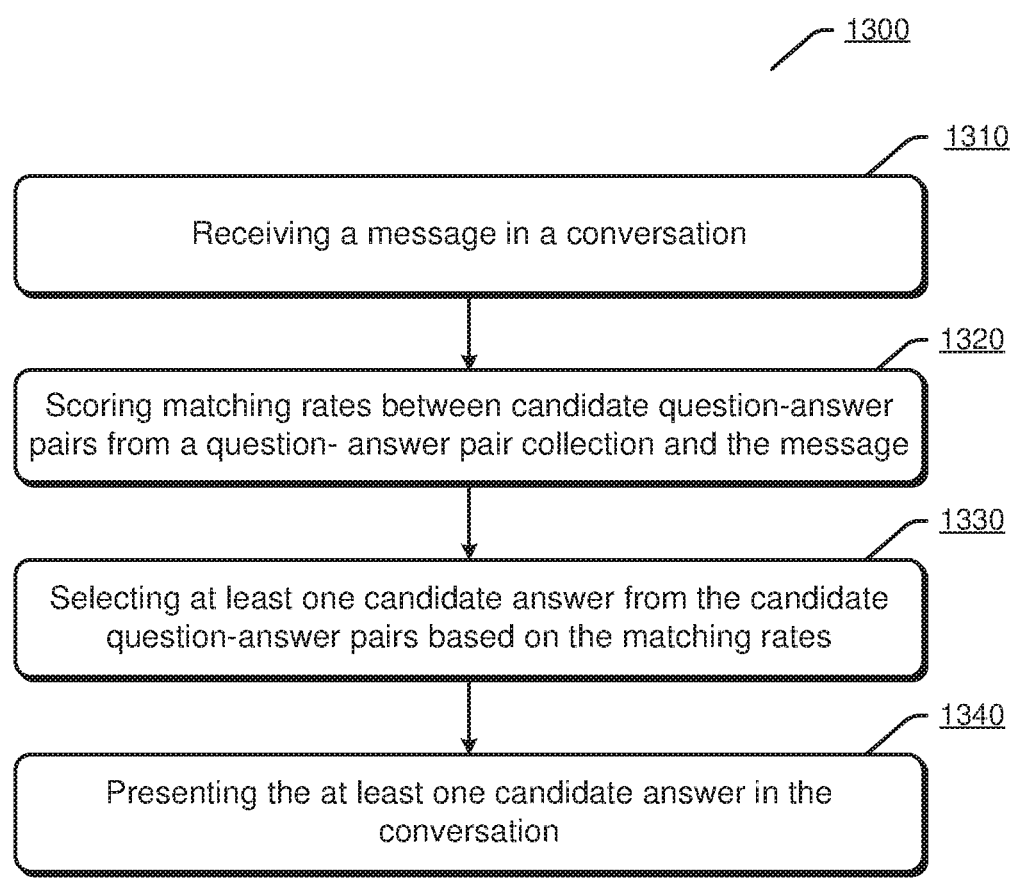
FIG. 13 illustrates an exemplary process for fitness assistance through automated chatting according to an embodiment

FIG. 13 illustrates an exemplary method 1300 for fitness assistance through automated chatting according to an embodiment.

At 1310, a message is received in the conversation. At 1320, matching rates between candidate question-answer pairs from a question-answer pair collection and the message are scored. At 1330, at least one candidate answer is selected from the candidate question-answer pairs based on the matching rates. At 1340, the at least one candidate answer is presented in the conversation.

In an implementation, the matching rates are scored based on at least one of: dependency arc similarity scores between a dependency tree of the message and dependency trees of candidate questions; dependency arc similarity scores between a dependency tree of the message and dependency trees of candidate answers corresponding to the candidate questions; and the user's and/or other users' emotional feedbacks for the candidate answers.

In an implementation, the question-pair collection is generated by: performing dependency parsing to sentences on web pages, extracting tuples from the parsed sentences, and transforming the tuples to question-answer pairs; and/or extracting question-answer pairs from web pages.

In an implementation, the question-answer pairs are extracted from web pages by: extracting a title and at least one essential sentence from a document of a web page; extracting at least one descriptive sentence from each part of the document related to each essential sentence; and forming question-answer pairs by taking the title and the at least one essential sentence as question and answer respectively and by taking each essential sentence and the corresponding at least one descriptive sentence as question and answer respectively.

Figure 14:
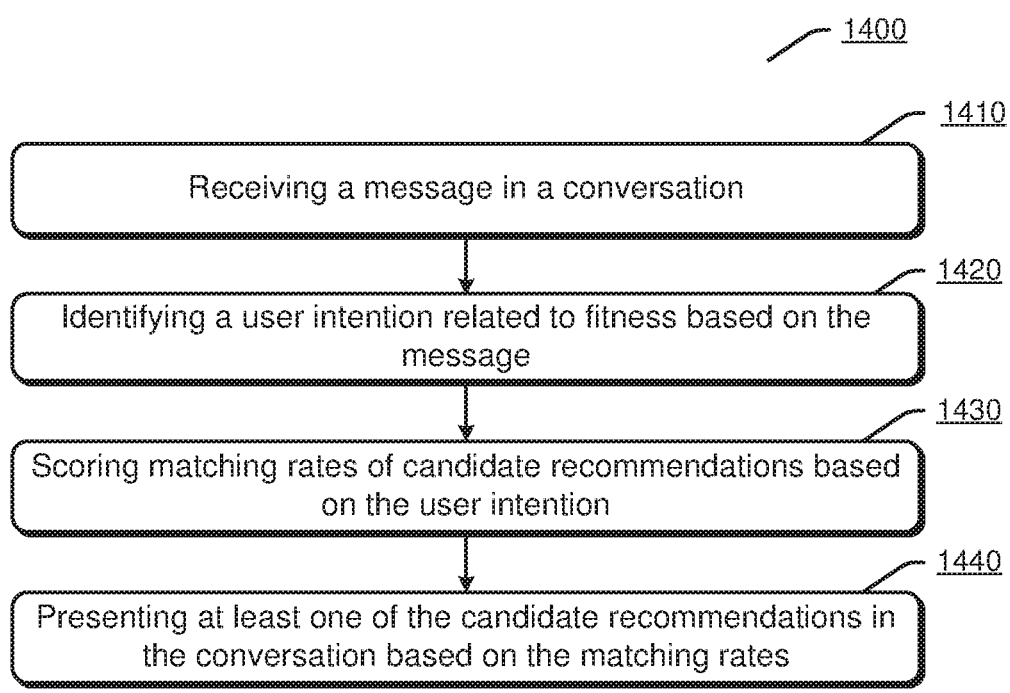
FIG. 14 illustrates an exemplary process for fitness assistance through automated chatting according to an embodiment

FIG. 14 illustrates an exemplary method for fitness assistance through automated chatting according to an embodiment.

At 1410, a message is received in the conversation. At 1420, a user intention related to fitness is identified based on the message. At 1430, matching rates of candidate recommendations are scored based on the user intention. At 1440, at least one of the candidate recommendations is presented in the conversation based on the matching rates.

In an implementation, the matching rates of candidate recommendations are scored based further on at least a part of a user profile of the user, click-through-rates of candidate recommendations with respect to the message, energy intake record of the user, exercise record of the user, keyword-bidding information of candidate recommendations, a knowledge graph related to fitness, a question-answer pair collection related to fitness, and product data set.

Figure 15:
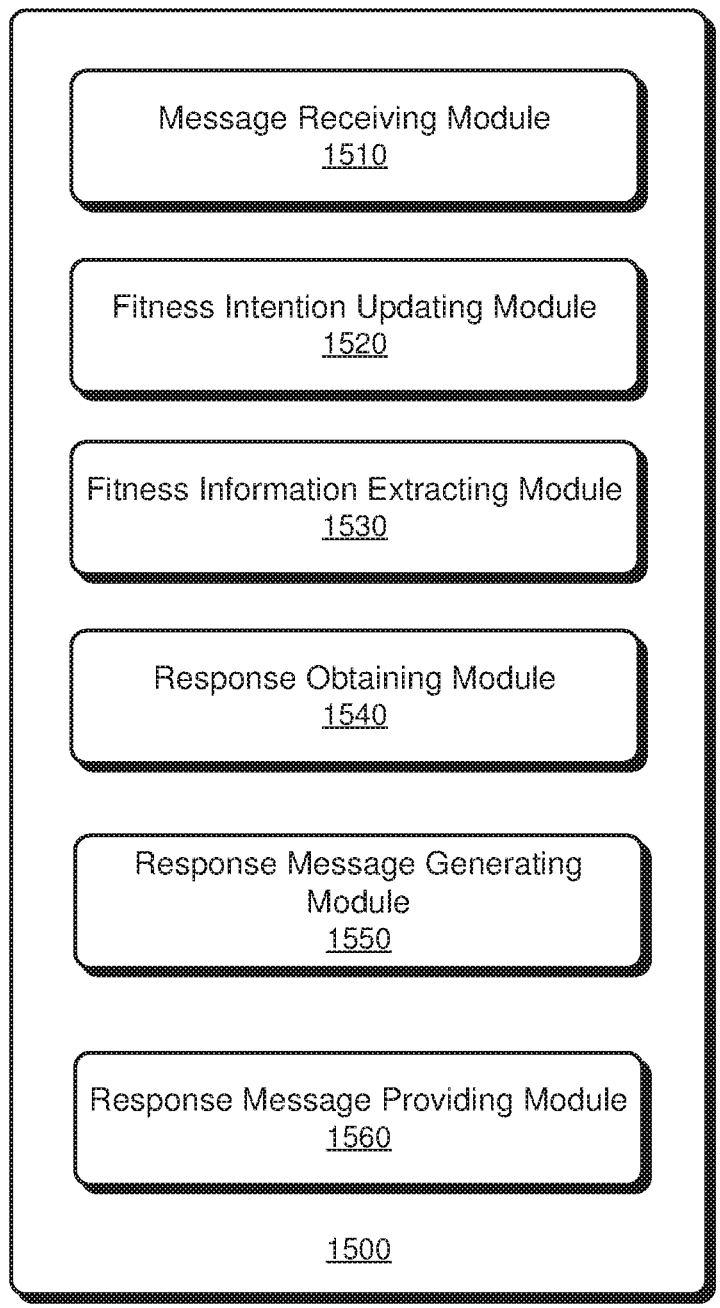
FIG. 15 illustrates an exemplary apparatus for fitness assistance through automated chatting according to an embodiment.

FIG. 15 illustrates an exemplary apparatus for fitness assistance through automated chatting according to an embodiment.

The apparatus 1500 comprises a message receiving module 1510, a fitness intention updating module 1520, a fitness information extracting module 1530, a response obtaining module 1540, a response message generating module 1550 and a response message providing module 1560. The message receiving module 1510 receives, in the conversation session, at least one message. The conversation session is between the user and an electronic conversational agent. The fitness intention updating module 1520 updates, based on the conversation session and one or more factors associated with the at least one message, a fitness intention associated with the user. The fitness information extracting module 1530 extracts, based on one or more factors associated with the at least one message, fitness information associated with the user. The response obtaining module 1540 obtains at least one response, through applying a set of rules on the fitness information and the fitness intention. The response message generating module 1550 generates, according to the at least one response, a response message including a fitness suggestion to the user. The response message providing module 1560 provides the response message including the fitness suggestion to the user.

In an implementation, the at least one message comprises an image message. The energy information obtaining module 1520 estimates energy information of the food based on the image message. The energy recording module 1530 identifies whether food shown in the image message is taken by the user based on a context of the conversation, and records the energy information as the energy intake information of the user if the food shown in the image message is taken by the user.

In an implementation, the energy recording module 1530 identifies the food shown in the image message is taken by the user based on the context of presenting a message to ask the user to provide food intake information and receiving the image message in response.

In an implementation, the energy recording module 1530 identifies whether the food shown in the image message is taken by the user based on an answer from the user in response to a question, wherein the question is about whether the food shown in the image message is taken by the user.

In an implementation, the apparatus 1500 comprises a user intention module for identifying a user intention based on the at least one message, and a recommendation module for providing a recommendation for the user in the conversation based on the user intention.

In an implementation, the message receiving module 1510 receives a second message in the conversation. The apparatus comprises a question answering module for scoring matching rates between candidate question-answer pairs from a question-answer pair collection and the second message, and selecting at least one candidate answer from the candidate question-answer pairs based on the matching rates. The message presenting module 1540 presents the at least one candidate answer in the conversation.

In an implementation, the message receiving module 1510 receives a third message in the conversation. The apparatus comprises a user intention module for identifying a user intention related to fitness based on the third message, and a recommendation module for scoring matching rates of candidate recommendations based on the user intention. The message presenting module 1540 presents at least one of the candidate recommendations in the conversation based on the matching rates.

In an implementation, the recommendation module scores matching rates of candidate recommendations based on at least a part of a user profile of the user, click-through-rates of candidate recommendations with respect to the third message, energy intake record of the user, exercise record of the user, keyword-bidding information of candidate recommendations, a knowledge graph related to fitness, a question-answer pair collection related to fitness, and product data set.

It should be appreciated that the apparatus 1500 may also comprise any other modules configured for performing any operations according to the various embodiments as mentioned above in connection with FIGS. 1-14.

Figure 16:
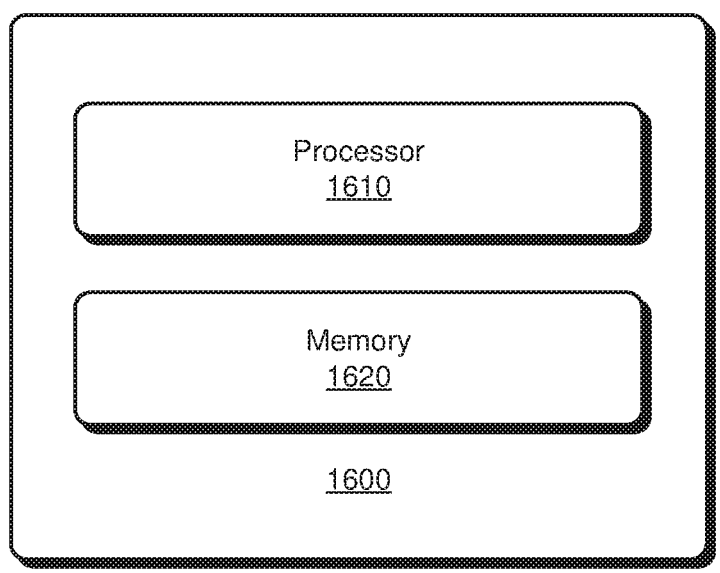
FIG. 16 illustrates an exemplary computing system according to an embodiment.

FIG. 16 illustrates an exemplary computing system 1600 according to an embodiment.

The system 1600 may comprise one or more processors 1610. The system 1600 may further comprise a memory 1620 that is connected with the one or more processors 1610.

The memory 1620 may store computer-executable instructions that, when executed, cause the one or more processors 1610 to receive, in the conversation session, at least one message, wherein the conversation session is between the user and an electronic conversational agent; update, based on the conversation session and one or more factors associated with the at least one message, a fitness intention associated with the user, extract, based on one or more factors associated with the at least one message, fitness information associated with the user, obtain at least one response, through applying a set of rules on the fitness information and the fitness intention; generate, according to the at least one response, a response message including a fitness suggestion to the user; and provide the response message including the fitness suggestion to the user.

It should be appreciated that the computer-executable instructions, when executed, cause the one or more processors 1610 to perform any operations of the processes according to the embodiments as mentioned above in connection with FIGS. 1-15.

The embodiments of the present disclosure may be embodied in a non-transitory computer-readable medium. The non-transitory computer-readable medium may comprise instructions that, when executed, cause one or more processors to perform any operations of the processes according to the embodiments as mentioned above.

It should be appreciated that all the operations in the processes described above are merely exemplary, and the present disclosure is not limited to any operations in the processes or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for fitness assistance to a user in a conversation session, comprising:
   receiving, in the conversation session, at least one message as part of an automated chatting service, the conversation session being between the user and an electronic conversational agent;
   updating, based on the conversation session and one or more factors associated with the at least one message, a fitness intention associated with the user;
   extracting, based on one or more factors associated with the at least one message, fitness information associated with the user;
   obtaining at least one response, through applying a set of rules on the fitness information and the fitness intention;
   generating, according to the at least one response, a response message including a fitness suggestion to the user, the generating the response message comprising:
      generating a plurality of question-answer pairs from extracted information from a webpage related to the fitness intention, the information including one or more of a title, at least one essential sentence from a document of the webpage, or at least one descriptive sentence from each part of the document of the webpage;
      scoring a matching rate for the response message based on the one or more factors associated with the at least one message and a question-answer pair from the plurality of question-answer pairs;
      selecting the response message based on the matching rate; and
      providing the response message including the fitness suggestion to the user in the conversation session.

2. The method of claim 1, wherein the one or more factors include at least one of energy information, exercise information, or product information.

3. The method of claim 1, further comprising:
   presenting, based at least on the fitness intention and the fitness information, another message for tracking an achievement of the fitness intention at a periodic time or at a predefined time.

4. The method of claim 1, wherein the fitness intention indicates at least one of fitness plan, product interest, service requirement, or no intention.

5. The method of claim 1, wherein the fitness information includes at least one of energy intake information, energy consumption information, type of exercise, health condition, or sports equipment.

6. The method of claim 1, wherein the fitness suggestion includes at least one of increasing energy intake, reducing energy intake, taking more exercise, taking less exercise, relaxing, a product related to fitness, or a service related to fitness.

7. The method of claim 6, wherein the fitness suggestion is obtained through ranking a plurality of candidate recommendations based on at least one of a user profile, click-through-rates of the plurality of candidate recommendations with respect to the at least one message, energy intake record, exercise record, keyword-bidding information of the plurality of candidate recommendations, a knowledge graph related to fitness, a question-answer pair collection related to fitness, or a product data set.

8. The method of claim 1, wherein the at least one message comprises at least one of a text message, a speech message, or an image message.

9. The method of claim 1, wherein the at least one message comprises an image message, and the extracting the fitness information further comprises:
- identifying one or more regions of interest (ROI) in the image message;
- estimating energy amount for each ROI; and
- obtaining the fitness information, by accumulating the estimated energy amount for each ROI.

10. The method of claim 1, wherein the obtaining the at least one response is further based at least on dependency arc similarity between the at least one message and candidate responses in a question-answer pair collection.

11. The method of claim 10, wherein the question-answer pair collection is generated through:
- performing dependency parsing on at least one sentence in a web page;
- extracting at least one tuple based on the dependency parsing:
- transforming the at least one tuple to at least one question-answer pair; and
- including the at least one question-answer pair in the question-answer pair collection.

12. The method of claim 10, wherein the question-answer pair collection is generated through:
- extracting the title and the at least one essential sentence from the document in the web page;
- extracting the at least one descriptive sentence corresponding to each essential sentence from a part of the document that is related to the essential sentence; and
- including the plurality of question-answer pairs generated based on one or more of the title, the at least one essential sentence, or the at least one descriptive sentence in the question-answer pair collection.

13. An apparatus for fitness assistance to a user in a conversation session, comprising:
- a message receiving module for receiving, in the conversation session, at least one message as part of an automated chatting service, the conversation session being between the user and an electronic conversational agent:
- a fitness intention updating module for updating, based on the conversation session and one or more factors associated with the at least one message, a fitness intention associated with the user;
- a fitness information extracting module for extracting, based on one or more factors associated with the at least one message, fitness information associated with the user;
- a response obtaining module for obtaining at least one response, through applying a set of rules on the fitness information and the fitness intention;
- a message generating module for generating, according to the at least one response, a response message including a fitness suggestion to the user, the generating the response message comprising:
  - generating a plurality of question-answer pairs from extracted information from a webpage related to the fitness intention, the information including one or more of a title, at least one essential sentence from a document of the webpage, or at least one descriptive sentence from each part of the document of the webpage;
  - scoring a matching rate for the response message based on the one or more factors associated with the at least one message and a question-answer pair from the plurality of question-answer pairs;
  - selecting the response message based on the matching rate; and
- a response message providing module for providing the response message including the fitness suggestion to the user in the conversation session.

14. The apparatus of claim 13, wherein the one or more factors include at least one of energy information, exercise information, or product information.

15. The apparatus of claim 13, wherein the fitness intention indicates at least one of fitness plan, product interest, service requirement, or no intention, and the fitness information includes at least one of energy intake information, energy consumption information, type of exercise, health condition, or sports equipment.

16. The apparatus of claim 13, wherein the fitness suggestion includes at least one of increasing energy intake, reducing energy intake, taking more exercise, taking less exercise, relaxing, a product related to fitness, or a service related to fitness.

17. The apparatus of claim 13, wherein the at least one message comprises an image message, and the fitness information extracting module is further for:
- identifying one or more regions of interest (ROI) in the image message;
- estimating energy amount for each ROI; and
- obtaining the fitness information by accumulating the estimated energy amount for each ROI.

18. A computer system for fitness assistance to a user in a conversation session, comprising:
- one or more processors; and
- a memory storing computer-executable instructions that, when executed, cause the one or more processors to perform operations comprising:
  - receiving, in the conversation session, at least one message as part of an automated chatting service, the conversation session being between the user and an electronic conversational agent;
  - updating, based on the conversation session and one or more factors associated with the at least one message, a fitness intention associated with the user;
  - extracting, based on one or more factors associated with the at least one message, fitness information associated with the user;
  - obtaining at least one response, through applying a set of rules on the fitness information and the fitness intention;
  - generating, according to the at least one response, a response message including a fitness suggestion to the user, the generating the response message comprises:
    - generating a plurality of question-answer pairs from extracted information from a webpage related to the fitness intention, the information including one or more of a title, at least one essential sentence from a document of the webpage, or at least one descriptive sentence from each part of the document of the webpage;
    - scoring a matching rate for the response message based on the one or more factors associated with the at least one message and a question-answer pair from the plurality of question-answer pairs;

selecting the response message based on the matching rate; and providing the response message including the fitness suggestion to the user in the conversation session.

19. The method of claim 1, further comprising:

identifying the fitness intention of the user based on the at least one message;

scoring a matching rate of a candidate recommendation, wherein the candidate recommendation is based on a part of a user profile of the user, an energy intake record of the user, exercise record of the user, or a knowledge graph related to the user; and presenting the candidate recommendation to the user in the conversation session.

\* \* \* \* \*